(12) United States Patent
Insler et al.

(10) Patent No.: US 7,218,642 B2
(45) Date of Patent: May 15, 2007

(54) METHODS AND SYSTEMS FOR HIGH SPEED BROADBAND DIGITAL LINK

(75) Inventors: Jules Insler, Bergenfield, NJ (US); Barry Nadler, Largo, FL (US)

(73) Assignee: Binj Technologies, Inc, Quincy, MA (US)

( * ) Notice: Subject to any disclaimer, the term of this patent is extended or adjusted under 35 U.S.C. 154(b) by 936 days.

(21) Appl. No.: 10/135,579

(22) Filed: Apr. 30, 2002

(65) Prior Publication Data

US 2002/0181404 A1    Dec. 5, 2002

Related U.S. Application Data

(60) Provisional application No. 60/287,802, filed on May 1, 2001.

(51) Int. Cl.
*H04J 3/16* (2006.01)
*H04L 1/00* (2006.01)

(52) U.S. Cl. .............. 370/465; 370/252; 370/208; 370/206; 375/320

(58) Field of Classification Search ............... None
See application file for complete search history.

(56) References Cited

U.S. PATENT DOCUMENTS

| | | | | |
|---|---|---|---|---|
| 6,038,251 A * | 3/2000 | Chen | ............... | 375/222 |
| 6,549,512 B2 * | 4/2003 | Wu et al. | ............... | 370/210 |
| 6,735,244 B1 * | 5/2004 | Hasegawa et al. | ............... | 375/219 |
| 6,823,002 B1 * | 11/2004 | Betts | ............... | 375/219 |
| 2001/0019593 A1 * | 9/2001 | Greaves | ............... | 375/355 |

* cited by examiner

Primary Examiner—Duc Ho
(74) Attorney, Agent, or Firm—Strategic Patents, PC

(57) ABSTRACT

Provided herein are methods and systems for a digital subscriber line protocol that does not require amplitude modulation, as well as methods and systems for such a protocol that can be used in combination with amplitude-modulation techniques to provide superior broadband DSL capabilities.

78 Claims, 26 Drawing Sheets

PRIOR ART

16-QAM Truth Table

| Amplitude | Phase | Code |
|---|---|---|
| 1.25V | P1-0° | 0000 |
| 1.25V | P2-90° | 0001 |
| 1.25V | P3-180° | 0010 |
| 1.25V | P4-270° | 0011 |
| 2.50V | P1-0° | 0100 |
| 2.50V | P2-90° | 0101 |
| 2.50V | P3-180° | 0110 |
| 2.50V | P4-270° | 0111 |
| 3.75V | P1-0° | 1000 |
| 3.75V | P2-90° | 1001 |
| 3.75V | P3-180° | 1010 |
| 3.75V | P4-270° | 1011 |
| 5.00V | P1-0° | 1100 |
| 5.00V | P2-90° | 1101 |
| 5.00V | P3-180° | 1110 |
| 5.00V | P4-270° | 1111 |

FIG. 3

PRIOR ART

METHODS AND SYSTEMS FOR HIGH SPEED BROADBAND DIGITAL LINK

CROSS-REFERENCE TO RELATED APPLICATIONS

This disclosure is based upon, claims priority to, and incorporates by reference a United States Provisional Patent Application entitled BROADBAND HIGH SPEED DIGITAL LINK (also erroneously entitled WATER TREATMENT), filed May 1, 2001, provisional application Ser. No. 60/287,802, naming Jules Insler and Barry Nadler as inventors. All patents, patent applications, texts, books and other documents referenced herein are hereby incorporated by reference.

BACKGROUND OF THE INVENTION

1. Field of the Invention

This invention relates to the field of telecommunications, and more particularly to a protocol for high-speed broadband data communication.

2. Description of the Related Art

Digital Subscriber Line, or DSL, protocols are well-known protocols for delivering relatively high-bandwidth transmissions over telephone lines. There are a variety of DSL protocols, which as a group are often designated xDSL protocols. The xDSL protocols include, for example, Asymmetric Digital Subscriber Line (ADSL), Rate Adaptive Digital Subscriber Line (RADSL), High Speed Digital Subscriber Line (HDSL), Symmetric Digital Subscriber Line (SDSL), Multirate Symmetric Digital Subscriber Line (MS-DSL), G.Lite (ADSL limited to 1.5 Mbits/sec with a built in POTS splitter) and Very High Speed Digital Subscriber Line (VDSL). Embodiments of DSL systems are disclosed in a standard of the American National Standards Institute, Inc. (ANSI), namely, ANSI National Standard T1.413, Network and Customer Installation Interfaces—Asymmetric Digital Subscriber Line (ADSL) Metallic Interface, published by American National Standards Institute, Inc. All versions of ANSI Standard T1.413 are hereby incorporated by reference. Further information about DSL systems, including ADSL and VDSL, can be found in a variety of books on the subject, including *ADSL/VDSL Principles: A Practical and Precise Study of Asymmetric Digital Subscriber Lines and Very High Speed Digital Subscriber Lines*, by Dennis J. Rauschmayer, MacMillan Technical Publishing USA, copyright 1999, which is also hereby incorporated by reference.

Two competing technologies for xDSL transmissions are Carrierless Amplitude/Phase (CAP) and Discrete Multitone (DMT). Both of these variants are based on a coding technique known as Quadrature Amplitude and Phase (QAM).

The current format of DSL is based upon DMT which is a form of Frequency Division Multiplexing (FDM). That is, there are multiple frequency cells which are combined to create a single, complex output. The modulation technique that is at the heart of this design is QAM uses a phase change and an associated amplitude to create the bit structure for DMT.

QAM combines variations in signal amplitude with an assigned phase. In the example that follows, phase and amplitude vary simultaneously over four values allowing each cycle to represent one of 16 discrete logical states. This allows 4 bits of data for a single wave cycle or 4 bits/Hz. Referring to FIG. 1, a 16 point constellation 100 is shown, which is often referred to as 16-QAM. The 16-QAM constellation 100 includes an in-phase axis 102 and a quadrature axis 104. The value of the in-phase axis 102 is often referred to as an "I" component and the value of the quadrature axis 104 as a "Q" component by those in the art.

The constellation 100 identifies a signal that is 4 bits/symbol. A chip set in a current design QAM system, be it CAP or DMT, generally uses 256-QAM to increase the number of bits/symbol to 8. FIG. 2 depicts a constellation of the second quadrant 200 of a 256-QAM system.

The combination of amplitude and phase values reflected by a given point in the QAM constellation can be used to render data bits. A QAM system translates the QAM amplitudes and phases into data bits by a mechanism such as a truth table. Referring to FIG. 3, a truth table 300 is shown for an embodiment of a 16-QAM system.

In QAM systems the lowest amplitudes produce lower signal to noise ratios (SNRs) as the line length increases. That is, as line attenuation increases, signal to noise ratio decreases. One problem with QAM systems is that varying signal amplitude (Amplitude Modulation, or AM) is susceptible to external interference.

Referring to FIG. 4, a schematic 400 shows a basic QAM modulator design. A data stream 402 is fed to an encoder 404 and split into two separate streams 405, 406. The streams 405, 406 are fed into two low pass filters 408, 410. Then the streams are modulated onto a sine component 412 and a cosine component 414 of a carrier frequency 418. This separation is the basis for forming the bitstream and realizes 4 bits/Hz. 16-QAM requires a signal to noise ratio (SNR) of 21.5 dB without error correction to maintain a bit error rate (BER) of $10^{-7}$. The two streams (which represent the in-phase and quadrature branches of the QAM signal) are added together to produce the composite QAM signal 420. The system can include various other components, such as shaping filters 422, 424.

There are a number of factors that affect the purity of a transmitted QAM signal. There is Gaussian white noise that is associated with all analog signals. When the noise is equal to or greater than the signal, the signal (for all practical purposes) becomes undetectable. This "noise floor" is what all transmitted signals need to exceed in order to be resolved at the receiving end. The question becomes, how much greater than the noise does a signal need be in order to be virtually error free? As stated above, a 16-QAM signal must be 21.5 dB above the noise floor to be correct at the receiving end in order to be virtually error free. (For all practical purposes, a BER of $10^{-7}$ represents error free performance.)

Another factor is external interference. There are many forms of external interference including cross-talk (where the signal from one of a pair of adjacent wires interferes with the signal from the other); bridge taps in the line, causing a notch at a narrow band of frequencies; and external interference such as impulse noise from phones going on and off hook. Also, there may be radio frequency interference (RFI) from nearby radio stations or other RF sources.

All of the above factors and others can cause errors in the bit stream, which must either be corrected at the receiving end or, at least recognized, signaling a need for retransmission of the errant message. As described later, many of these problems can be improved via the use of error correction algorithms.

Amplitude Modulation systems inherently depend on accurate recognition of varying amplitudes. As a result, AM systems are very susceptible to all of the interfering factors described above. This particular weakness of all QAM systems will be addressed in the invention disclosed below.

As mentioned above, most CAP or DMT systems use 256-QAM to increase the number of bits per transmitted symbol. The bit structure for 256-QAM is much denser and the bits are closer together than 16-QAM, allowing an interfering signal to more easily corrupt this structure. 256-QAM is also more susceptible to interference from wave to wave. This distortion, known as "Intersymbol Interference" (ISI), occurs when a band-limited channel spreads a channel response to an input symbol beyond its duration period. Tails of previous channel responses interfere with a current one, changing the amplitude of a received signal at re-sampling time. If the amount of ISI is high enough, the receiver threshold logic will read an incorrect value. Once again, the weakness of QAM, AM susceptibility, is problematic for overcoming ISI. The second quadrant block of the 256-QAM constellation 200 shows the close proximity of the symbols in 256 QAM systems.

A 256-QAM system can produce 8 bits/symbol, which corresponds to 8 Mbits/sec when the carrier frequency is 1 MHz. 256-QAM requires a 33.5 dB SNR to maintain a BER of $10^{-7}$ when the data rate is 8 Mbits/sec, or 16 times the SNR of 16-QAM. Since an unmodified QAM system could not maintain a SNR of 33.5 dB for very long cable runs, or in the presence of interference, various techniques are used to attempt to keep the SNR as high as possible. Certain types of techniques are discussed below in conjunction with a discussion of two forms of QAM, namely, CAP and DMT Modulation.

Referring to FIG. 5, the encoding scheme of CAP is equivalent to QAM. In this example the orthogonal signal modulation is done digitally by a state encoder 502, in-phase filter 504 and quadrature filter 508. A Digital to Analog Converter (DAC) 510 converts the signal to analog before transmission. This approach allows the QAM technique to be implemented digitally and only the output remains an analog function. Of course, this is CAP in a simplified form. In real applications, CAP is rate-adaptive to conform to varying noise and interference conditions.

The "Web Proforum" group, an arm of the ADSL Forum, ran tests on CAP Rate Adaptive Digital Subscriber Line (RADSL) in the presence of various interfering sources. They found that a 272 kb/sec upstream signal in the presence of a T1 signal is degraded by 15%. That is, if the signal were on a 26 AWG twisted pair phone line and was reaching 26 kfeet, in the presence of T1 interference it would only reach 22 kfeet. Worst case for CAP RADSL was a 784 kb/sec SDSL signal. In this case, the signal reach is degraded by 54% or, reduced from 26 kfeet to 12 kfeet. This degradation translates to a rate reduction in the upstream rate that may be unacceptable for the user. In fact, since CAP RADSL adapts its rate in 300 kbits/sec steps, the rate drop may make this line unusable.

DMT also uses a type of QAM modulation but the implementation is very different from CAP. CAP operates with a single frequency, while DMT operates with multiple frequencies. A given CAP symbol only lasts for a short time, but over a very wide bandwidth. Each DMT symbol lasts for 250 microseconds but is very narrow in bandwidth (4 kHz).

DMT is subject to an ANSI standard, T1.413. This standard describes the constituent parts required to design a DMT system. It also includes a test portion where various line lengths and taps are defined. This allows manufacturers to design chip sets based upon a standard so that some compatibility between vendors is possible.

Referring to FIG. 6, a block diagram is provided for a simple DMT Modulator 600. It is more complicated than a CAP RADSL design, but because it uses QAM as its basic modulation scheme, it is similar to CAP. There are, however, some advantages of using DMT over CAP.

Each CAP symbol transmitted takes all of the channel bandwidth; therefore, a high-level noise impulse, (noise in the time domain) and high-level frequency domain noise (noise present for a long time at a narrow frequency range) will both cause errors in CAP systems. With DMT, frequency domain noise is somewhat avoided, and, since the data rates per channel are lower and symbols longer, the effects of time domain noise are reduced.

In FIG. 6, a Reed-Solomon (RS) forward error correction (FEC) coder 602, 604 or RS Coder, is provided for each branch of the split data stream 608, 610, which is split by a MUX 612. In RS coding, the data stream is broken up into blocks and redundant data is added to the blocks. During processing, a series of finite field adds and multiplies results in each data register (in the processor) containing one check symbol after the entire input data stream has been entered. This encoding scheme must then be decoded at the receiving end.

Decoding the RS coded data stream is a multi-step process. A known field polynomial is used as the basis of creating the RS coding. If there are no errors in the data stream, a comparison to this known polynomial will result in an output of zero. If there are errors, the resulting polynomial is passed to the Euclid algorithm, where the factors of the remainder are determined. This result is then evaluated for each of the incoming symbols (over many iterations) and errors that are found are corrected. This technique provides 3 to 5 dB of improvement in SNR. If there are more errors than can be corrected, then the received codeword is output and a flag is set indicating that error correction has failed. This flag initiates a request to re-transmit the codeword.

The DMT Modulator 600 may optionally include an interleaver 614 for interleaving data of one of the data streams 610. In addition to RS Coding to restore bit errors, there is a bit mapping technique known as Trellis Coding to prevent interference from causing sequential errors in the data stream. The addition of Trellis Coding also provides controlled redundancy by doubling the number of signal points and, interference will not cause sequential errors, because the bits are re-coded in an order that will prevent sequential errors. In the case of 256-QAM, coding gain due to Trellis Coding is a factor of 5.5 or a 7 dB increase in SNR.

The combination of RS Coding and Trellis Coding provides a maximum of 12 dB increase in SNR. This improvement becomes very significant when loop length becomes greater than 12,000 feet or when the external interference is distorting the bitstream. The downside of using both of these error correction schemes simultaneously is an increase in overhead of 15% to 20%. Therefore, when both techniques are operating, the actual throughput (worst case) of a 6.144 Mbit/sec system is 4.915 Mbits/sec. This is the required overhead to correct an errant symbol. The alternative, of course, is to re-transmit every time there is a symbol error, which would result in a 50% (worst case) reduction in throughput. In reality, the typical DMT system transmits more than 8 bits/symbol to maintain, under most conditions, a 6.144 Mbit/sec rate. If an interfering signal degrades one or more cells beyond use, the system can adjust by eliminating cells and decreasing the bit rate at 32 kbit/sec per reduction.

In a DMT design, the frequency band is split into 256 channels of 4.3125 kHz size. As can be seen in FIG. 5, the channels utilized by the Upstream data are from 26 kHz to 134 kHz, and from 138 kHz to 1.104 MHz for the Downstream portion.

Since each sub-carrier can transmit symbols (at the frequency of its sub-carrier cell), the sum of the symbols is a rate of 6.144 Mbits/sec when 256-QAM is used. In FIG. 6, the DMT Symbol Buffer 618 and the mapper 620 are the devices that code each QAM symbol and transmit it to one of the cells in the DMT Modulator 600. Each of these signals is passed to the IFFT 622, which performs an Inverse Fast Fourier Transform (IFFT) algorithm. This transforms the QAM signals into 256 symbols and passes them to the parallel in serial out module (PISO) 624. The PISO 624 module converts the bitstream from parallel to serial and then passes the signal to the DAC 628 to perform a digital to analog conversion before passing the signal through the low pass filter 630. This output is then transmitted to the receiving Modem via a line driver 630, using, most often, an Automatic Gain Circuit (AGC) to adjust the signal level based on the specific line length.

The "Web Proforum" ran a series of tests on DMT to determine what level of degradation would occur, in the presence of various types of crosstalk. The upstream signal under test was operating at 272 kbit/sec on a 26 kft local loop. The interfering signals consisted of HDSL, T1 AMI, ISDN and an SDSL signal at 784 kbits/sec. The T1 AMI signal had only a small effect on the test signal while the HDSL and SDSL signals reduced the signal reach to 12 kft or a 54% reduction. What is interesting about this result is that the DMT signal was affected by the SDSL signal as much as the CAP signal was. This indicates that neither design is a real solution to maintaining system throughput in the presence of these interfering signals.

Referring to FIG. 7, in a typical DMT system, there are 256 frequency cells 702 each of which is 4.3125 kHz wide. The highest frequency 704 being 1.104 MHz and the lowest frequency 708 being 26 kHz.

FIG. 8 shows a schematic for an embodiment of a DMT transmitter 800. The binary data stream 802 is fed into an encoder 804, which may generate CRC codes, and may serve as an interleaver, scrambler, forward error correction encoder, and/or integer-to-bit converter. A mapper 808 may assign a pre-determined number of bits to each of 256 Inverse Fast Fourier Transforms (IFFT) 810 which perform the QAM function and then pass the output to an Analog line driver 812 to send the signal to the transmission line. The number of bits assigned to a given IFFT may be determined by the noise level that is measured or predicted for that frequency. Thus, high-noise areas (such as high frequency regions, or frequencies that correspond to known interference sources, such as T1 lines) can be assigned fewer bits than low-noise areas.

It is the QAM function that creates the DMT bit stream and modulates the different frequency cells being transmitted across the Local Loop (telephone line) between the customer and the Central Office (CO).

SUMMARY OF THE INVENTION

Provided herein are methods and systems for a Digital Subscriber Line (DSL) protocol that is referred to as High Speed Broadband Digital Link (HBDL) or, interchangeably, Broadband Digital Link (BDL). This protocol will be effective with, and consistent with, all forms of DSL.

Provided herein are methods and systems for providing digital subscriber line communications. The methods and systems include facilities for generating a signal of a plurality of tones, the variation in tones producing a change in the phase of the signal; transmitting the signal over a communications facility; measuring a characteristic of the received signal; and determining a value of a data bit based on the value of the measured characteristic. In embodiments the value determined does not require calculation of an inphase component and does not require calculation of a quadrature component. In embodiments, the measured characteristics include peak phase, peak-to-peak time, off time, flat time, event time, and ratios of the foregoing. In embodiments, amplitude can be measured as well, the measured characteristic is a peak phase. Also provided herein are methods and systems for various transmitter and receiver embodiments that facilitate DSL transmissions that take advantage of transmission of these various characteristics.

The HBDL designs described herein eliminate the AM modulation problem inherent in CAP and DMT. HBDL utilizes a variety of modulation techniques apart from AM modulation. Among these techniques are techniques that use certain characteristic elements of a modified form for the transmitted waveform or symbol. Three of these characteristic elements are peak phase, flat time (or symbol width), and peak-to-peak time (or time between symbols). The combination of two peak phase bits, three flat time bits and three peak-to-peak bits can generate eight bits per transmitted symbol. These components are orthogonal. As more particularly described below, it is also possible to use an inverted wave form to generate another bit of data, and it is possible to use ratios of the characteristic values to produce additional bits of data.

While HBDL does not require use of an amplitude bit, making it less susceptible to noise than QAM systems, it is possible to use an amplitude bit in low noise environments to provide additional data in conjunction with the basic HBDL system.

BRIEF DESCRIPTION OF THE FIGURES

FIG. 3 is a truth table for converting amplitudes and phases to bits in 16-QAM.

FIGS. 15–19 show a truth table for an embodiment of an HBDL system.

DETAILED DESCRIPTION

Figure 1:
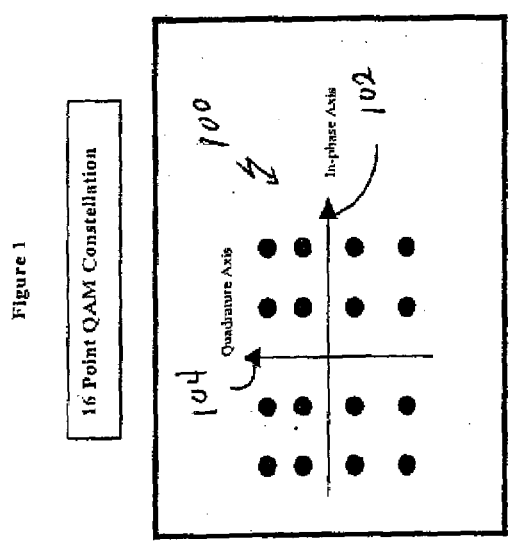
FIG. 1 depicts a constellation of values for use in a form of quadrature amplitude modulation known as 16-QAM.
Figure 2:
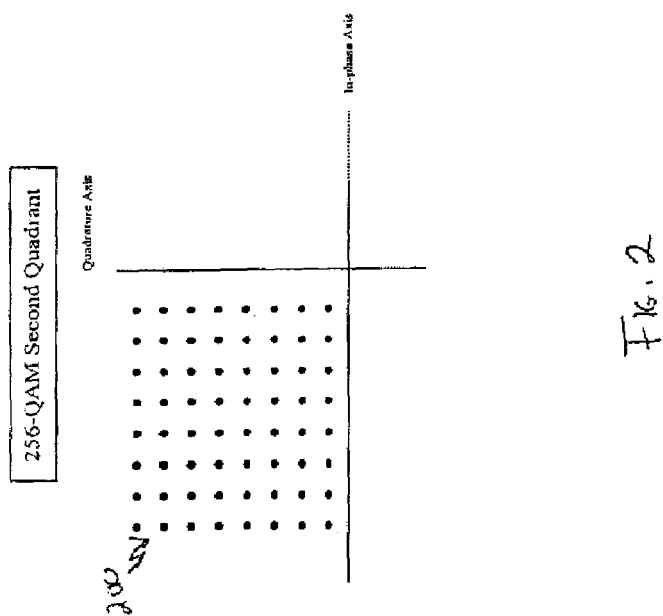
FIG. 2 depicts a constellation of values for 256-QAM.
Figure 4:
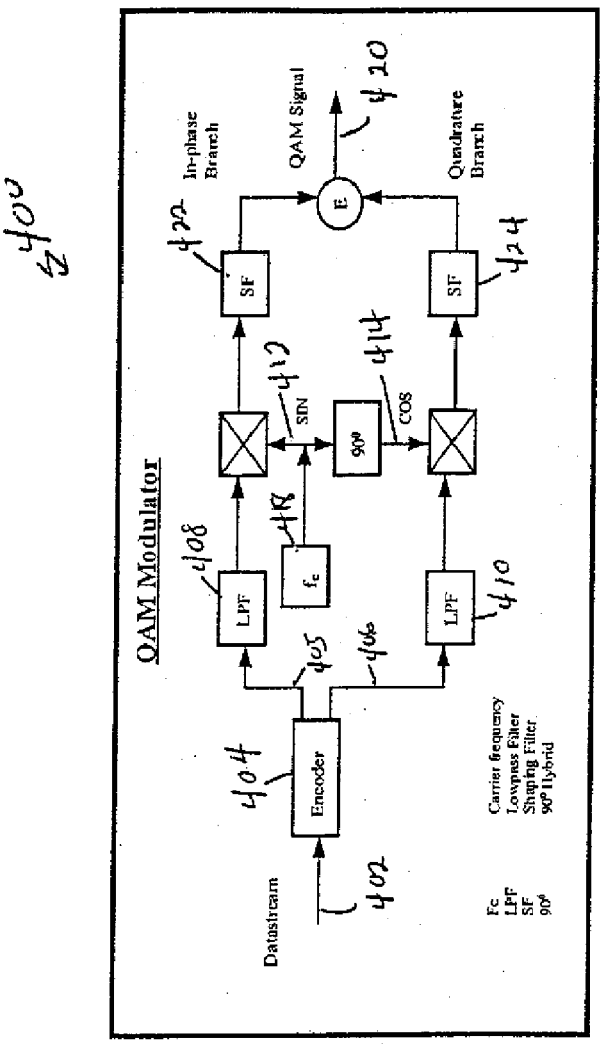
FIG. 4 depicts an embodiment of a QAM modulator.
Figure 5:
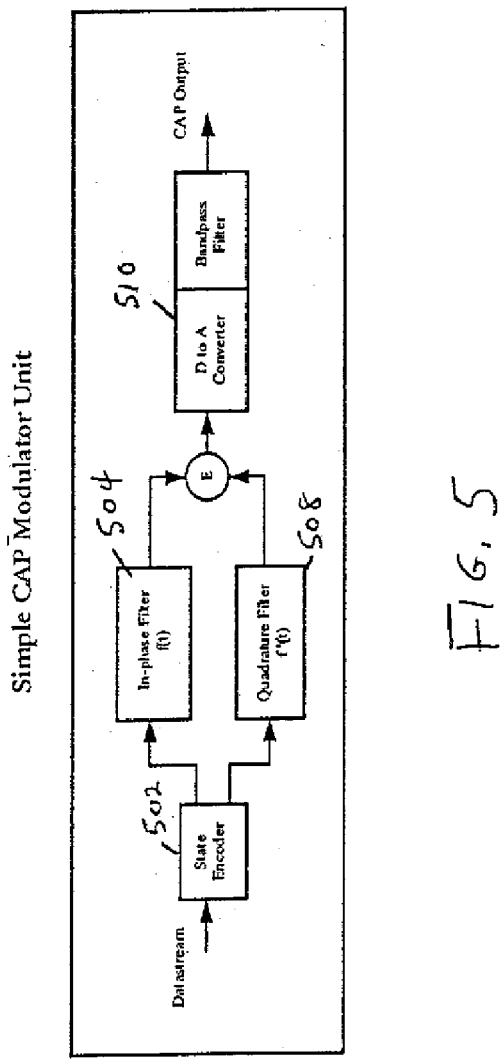
FIG. 5 depicts an embodiment of a CAP modulator.
Figure 6:
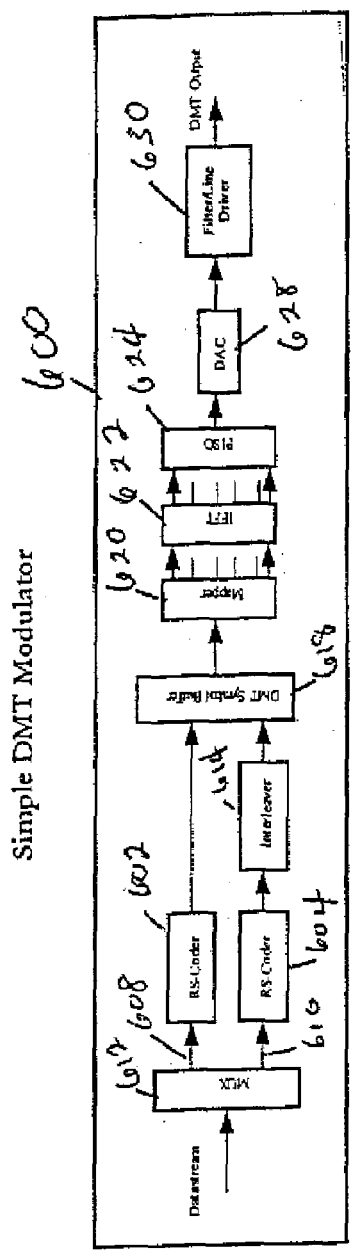
FIG. 6 depicts an embodiment of a DMT modulator.
Figure 7:
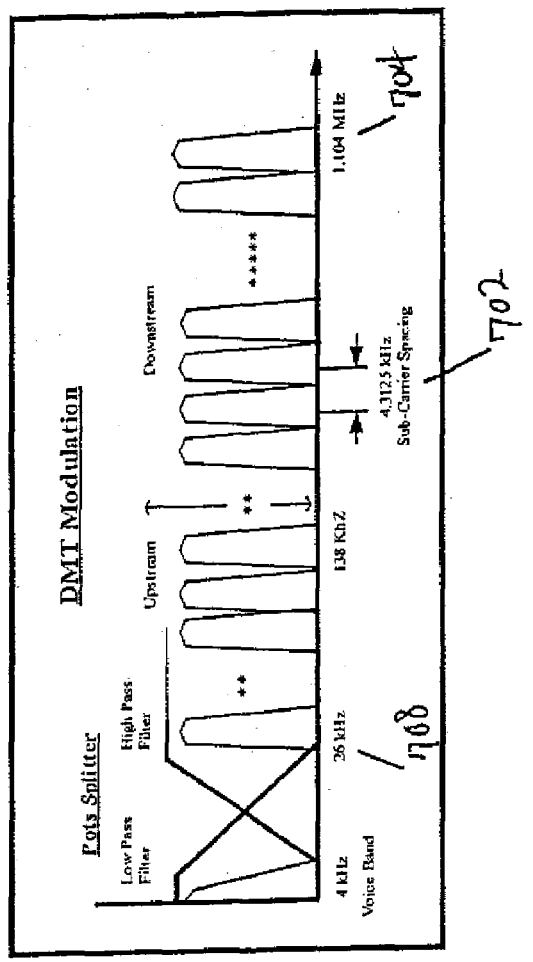
FIG. 7 is a schematic diagram that shows elements of DMT modulation.
Figure 8:
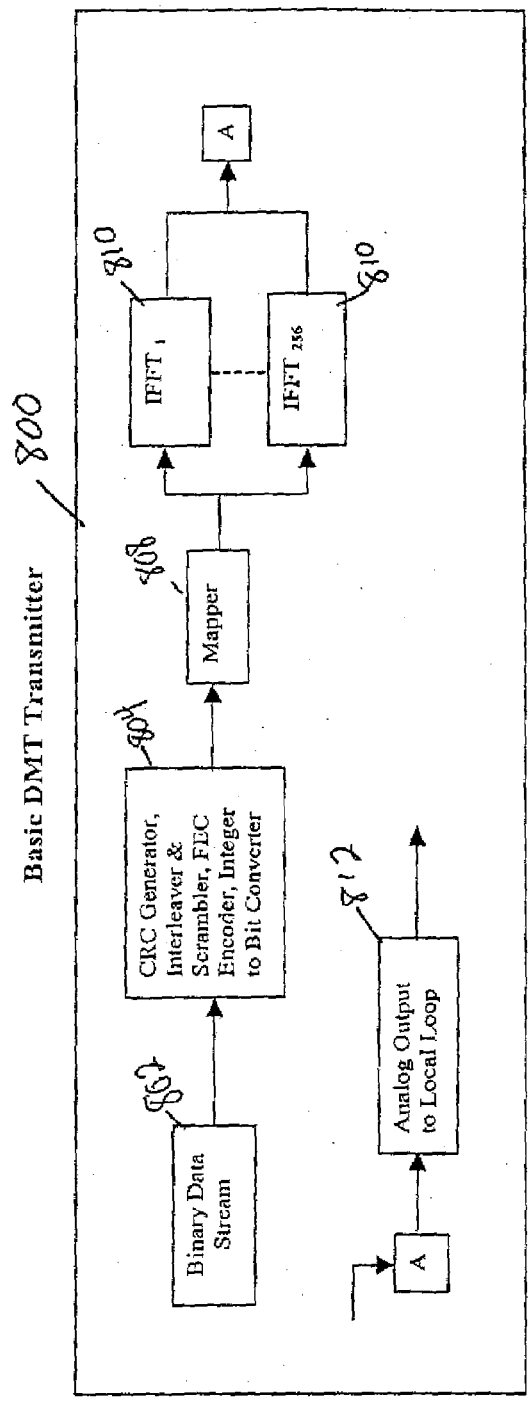
FIG. 8 is a schematic of an embodiment of a DMT transmitter.
Figure 9:
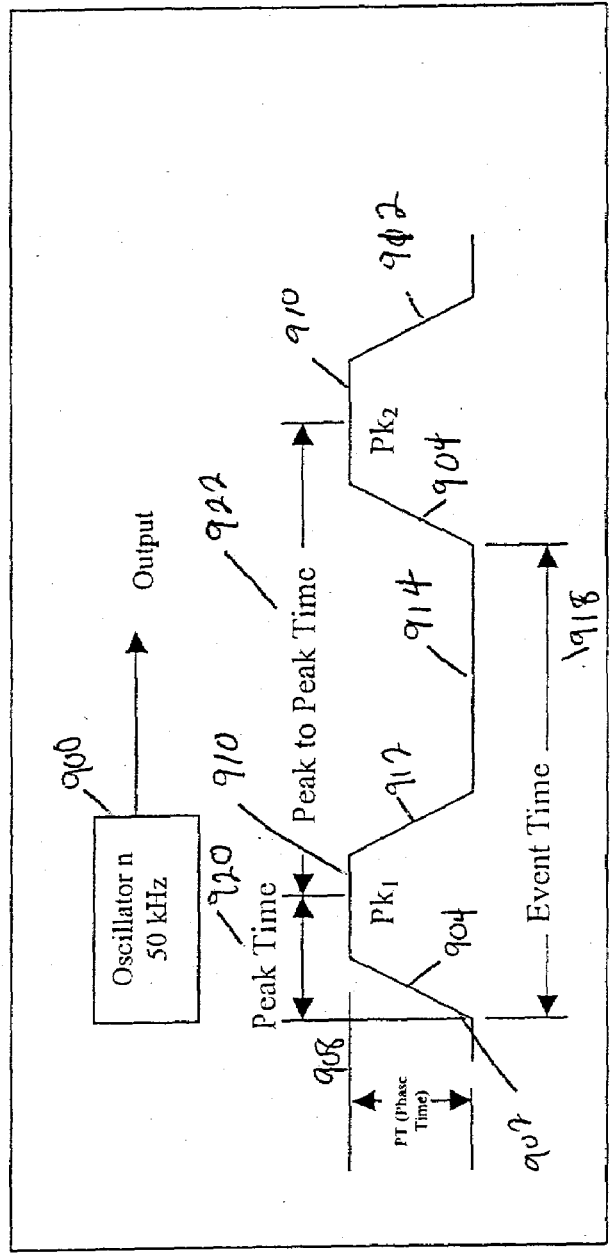
FIG. 9 is a schematic showing elements used to generate an HBDL symbol.

As mentioned above, the HBDL concept replaces the QAM function with a new modulation technique. There are optionally a variety of different design methodologies to HBDL. The first and driving force behind the concept is phase change. That is, at a given frequency, the phase angle of the signal is changed from a starting point to a predetermined end point. If a signal is initially sitting at a phase angle of 0°, and then slowly modified to a phase angle of 45°, we will have a signal whose rising edge is increasing in amplitude (at the output of a coherent phase detector) until the 45 degree point has been reached. Referring to FIG. 9, for discussion purposes, we have an oscillator 900 operating at 50 kHz. If we change the frequency of the oscillator to 51 kHz, the phase output of the oscillator 900 changes until we return to the original frequency of 50 kHz. We then hold this output for a period of time (resulting in the flat top of the peak of the wave form) and then change the output to 49 kHz for the same amount of time it was at 51 kHz. Of course, using a set of oscillators is only one way to generate different frequencies. Many other embodiments are possible, such as using a phase modulator, or similar facility, to produce the same effect.

It is the change in frequency that a phase detector will sense as a phase change. As long as the frequency remains at the "new" 51 kHz value the phase will drift or change until the oscillator is returned to 50 kHz. This produces the output signal 902 as seen in FIG. 9. Note that the phase increases in a region 904 until it reaches a peak phase, or phase time (PT) 908. This region 904 reflects the drift of phase while the oscillator is at a higher frequency. In a region 910 the phase remains flat at the peak phase 908 while the oscillator is kept at the original frequency. Then in a region 912 the phase returns to the original phase, which occurs as the oscillator is set at a frequency below the original frequency (e.g., 49 kHz) for a period equal to the time it was set at the higher frequency during the increase in phase. The oscillator is then kept at the original frequency for a period of time, reflected by the region 914 of FIG. 9. The cycle can then be repeated, creating another upward drifting region 904, peak region 910, downward region 912 and flat region 914. The time between each initiation of the increased frequency of oscillation can be labeled the event time 918.

Although FIG. 9 shows one oscillator operating in the region of 50 kHz, there can in fact be many "oscillators" at the many frequencies that can be produced an multiplexed to generate an HBDL signal. In fact, an HBDL design is not constrained to a 4.325 kHz cell size as is used in a DMT system. The cell size will vary depending on the frequency of transmission. In an HBDL system, the frequency varies from 26 kHz to a higher frequency, for example it might end at 30 MHz. Cell size is determined by the frequency regions of operation.

Referring still to FIG. 9, we can define a number of parameters that depend on the timing and shape of the wave form generated by the oscillator(s). These parameters can then be used to code bits for purposes of transmitting a data stream. The event time (ET) 918 can be defined as the time from the start of a phase change to the next start of a phase change. The Peak Time ($PK_T$) 920 can be defined as the time from the start of a phase change to ½ the flat time (FT) 910. Flat time (FT) is the time the peak phase is held constant. The peak-to-peak time (PPT) 922 can be defined as PKn Time plus PKn+1 Time plus off time 914. In the case where the phase is not inverted, off time (OT) can be defined as the time from when the lower frequency is off (and the original frequency is turned on) until the time when the higher frequency oscillator is next turned on (and the original frequency is turned off again). Off time would be the reverse in the case of the inverted signal. Off time can also include the filter delay associated with a filter in the system. Thus, $$PK_T = PT + \tfrac{1}{2} FT \qquad 1.$$

$$PPT = PK_1 + PK_2 + OT \qquad 2.$$

$$ET = 2PK_1 + OT \qquad 3.$$

Bits are formed via combinations of these orthogonal states. That is, the number of resolvable phases that are used, the number of resolvable flat times and the number of resolvable peak to peak times will determine the number of bits available. These states are orthogonal because a change in one is independent of a change in one of the others.

Figure 10:
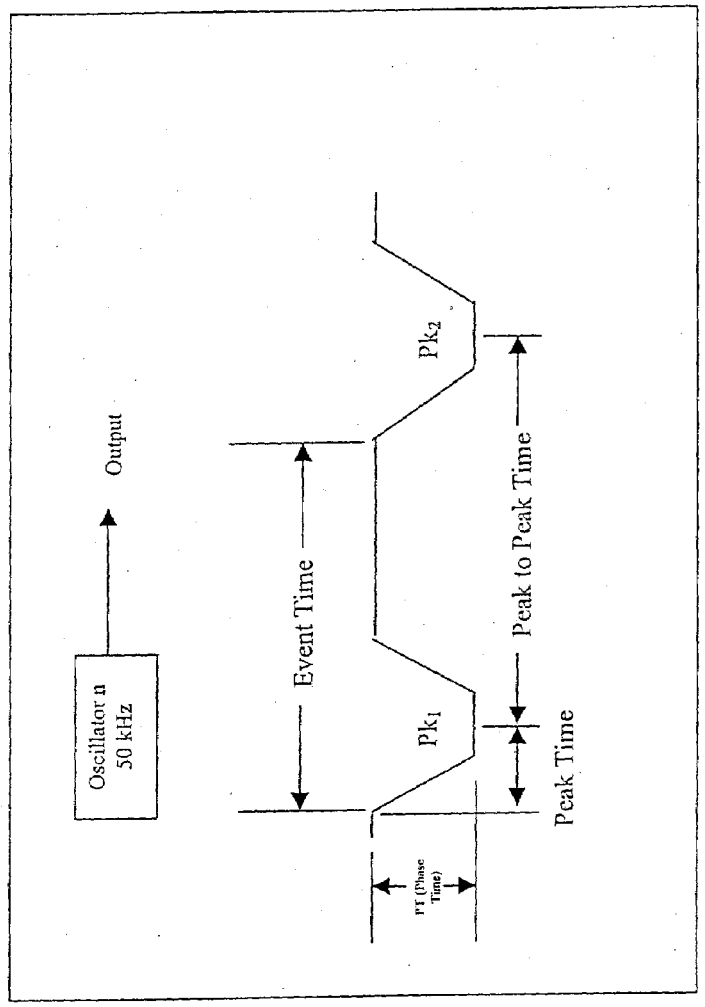
FIG. 10 is a schematic showing elements of a reverse direction symbol for use in HBDL.

Referring to FIG. 10, an additional bit can be generated simply by reversing the oscillator conditions. If the direction of the "oscillator" is reversed, that is, the 49 kHz output is turned on and then (after a flat time) the 51 kHz "oscillator" is turned on. Of course the frequencies are arbitrary, and any group of frequencies could be used to produce the desired form. The reversed sequence will produce a negative going output as compared to that of FIG. 9 in which the higher frequency oscillator is turned on before the lower frequency one.

One benefit of making gradual phase changes is that there is less spectral spreading, meaning less interference, than in systems like QAM that have rapid phase changes. Additionally, the shape of the phase time waveform has a decided wavelet appearance that may be useful in CWT processing.

Since the basic HBDL design does not require amplitude as one of its orthogonal components, it will not be as susceptible to interference and noise as QAM based systems are. Also, since all symbols are at the same amplitude, HBDL has a 12 dB advantage in SNR relative to 16-QAM because in HBDL the amplitude can be held constant at 5 volts. For this reason HBDL will have a much larger gain in SNR if compared to 256-QAM.

The way this translates to improved throughput is as follows. When the line length becomes very long, the lower amplitudes begin to become error prone, causing a typical DMT or CAP system to reduce the transmitted bits/sec to accommodate the decline in SNR. With HBDL, there is another 12 dB additional head room of SNR degradation before we would require a bits/sec reduction. In fact, because there are no AM components in the three elements, we are able to operate at a lower SNR than CAP or DMT before the system reduces its bits/sec.

If, for example, the SNR was 5 dB, a DMT system could, best case, transmit at 1 Mbit/sec. Based on testing of a much simplified form of HBDL, it can be demonstrated that it would be able to transmit at not less than 2.6 times this rate or 2.6 Mbits/sec. For versions that take advantage of ratio testing, flat times, and amplitude, much higher rates are possible. In addition, HBDL can take advantage of the in-phase and quadrature components that are used in QAM, adding further to the capability. This demonstrates the advantage HBDL has over the existing technologies. When Loop distances (cable runs from user to Central Office (CO)) become greater than 9,000 feet, the SNR is degraded to a point where CAP or DMT are required to back off from their maximum rates. Assuming a gain of a multiple of not less than 2.6 in capability, HBDL would maintain throughput out to 12,000 feet and still maintain a BER of $10^{-7}$, and HBDL would maintain 8 Mbits/sec out to 15,000 feet. At 9,000 feet, CAP or DMT can only meet the needs of <30% of households, while at 15,000 feet, HBDL would under this assumption meet the needs of >70% of households.

Most current ADSL systems increase their power output over the +7 dBm required by the telephone companies so that they can operate more effectively over long line lengths. This may become a problem in the near future. The FCC is considering rules for DSL devices that would prevent interference with other existing services. One proposal indicates a maximum signal power at the premise end of +7 dBm at 500 kHz. The allowed power drops to −3 dBm above 500 kHz. This requirement will further limit the reach of CAP and DMT systems, reducing the delivered rate at distances above 9,000 feet to less than the 1.5 Mbits/sec currently achieved for Loop distances up to 18,000 feet on 24 AWG wire. Based on the assumption that HBDL will increase capacity by not less than a multiple of 2.6, HBDL would be able to deliver 4 Mbits/sec at 18,000 feet even when the power is reduced to −3 dBm.

Figure 11:
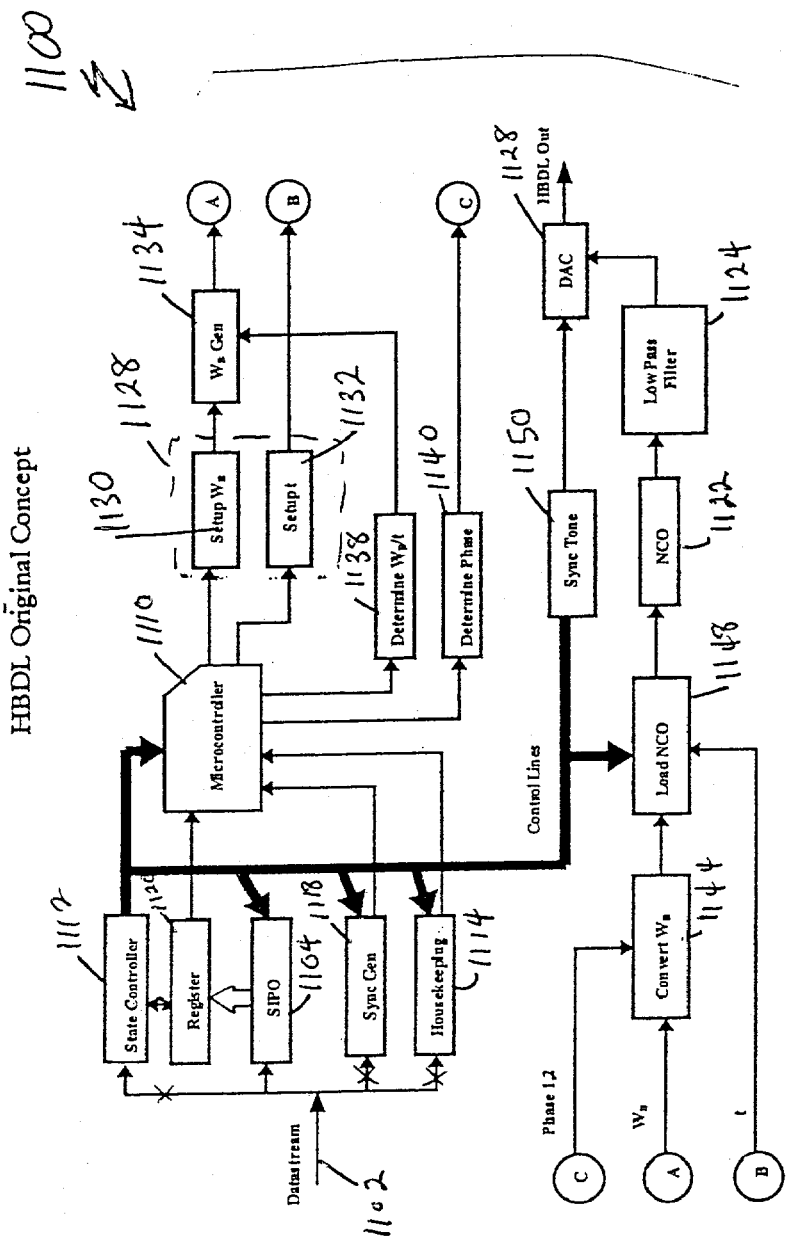
FIG. 11 is a schematic showing elements of a system design for an embodiment of HBDL.

Referring to FIG. 11, an embodiment of an early design for a transmitter for an HBDL system 1100 is provided. This embodiment is for a single-frequency implementation with a wide filter (that could go, for example, from 26 kHz to 1.104 MHz). It should be noted that HBDL systems can be implemented with a variety of approaches, including (i) a single-frequency approach with an in-phase tone only, (ii) a single tone approach similar to CAP that uses Inphase (I) and Quadrature (Q) components, (iii) an OFDM or frequency division multiplexing approach using multiple inphase orthogonal tones or frequencies only, and (iv) an approach similar to DMT and OFDM using multiple Inphase (I)/Quadrature (Q) orthogonal tones. Some of these embodiments are described herein, and the implementation of the others would be understood to one of skill in the art, given the disclosure provided herein. Different embodiments may have different advantages. In a low noise environment an advantage of a single frequency design is simplicity. This is counterbalanced by the disadvantage of in-band occurrence of noise, interference, or both. Because HBDL has design versatility it can mitigate impairments caused by interference through tone agility. Tone agility involves the ability to locate and move to a frequency region that is relatively free of interference. In many cases this requires only a small loss of data rate while maintaining an acceptable BER. Tone space agility can be used in various embodiments of HBDL disclosed herein.

In the embodiment of FIG. 11, a single-frequency embodiment is provided. The frequency cells are very large, in contrast to a DMT-like implementation with small frequency cells. In this embodiment, a data stream 1102 is fed into a serial in, parallel out (SIPO) device 1104. The SIPO 1104 moves the data into a register 1120 in an orderly fashion, so that new data can be fed into the SIPO 1104. In response to receiving a data stream 1102 (or when powered on or otherwise initiated into operation), a state controller 1112 identifies an incoming data stream and controls a variety of other devices. The state controller 1112 knows when data is being loaded from the register 1120 into a microcontroller 1110 by the state controller 1112 receiving data from a register 1120. The state controller 1112 and register 1120 may be in operative connection with each other. The state controller 1112 controls the various devices during various system states.

The register 1120 sets up the data stream 1102 and transfers groups of data to the microcontroller 1110 for processing. The register 1120 notifies the state controller 1112 when the data is ready in the microcontroller 1110 for processing. The state controller 1112 sets up the timing in the microcontroller 1110 to notify it when to break up data into its various parts.

The state controller 1112 also controls a housekeeping device 1114, and the state controller 1112 tells the housekeeping device 1114 when to do its jobs. The housekeeping device 1114 keeps track to ensure that details are taken care of at the end of a period of time, such as ensuring that resyncing is done appropriately when that needs to be done. The state controller 1112 also controls the SIPO 1104.

The purpose of the sync function is to synchronize the receiver side of the HBDL system. The sync function is provided by a sync generator 1118 which is also controlled by the state controller 1112.

Incoming data is fed from the register 1120 to the microcontroller 1110 which is also under control of the state controller 1112. The microcontroller 1110 will generate elements used to produce an input wave form for a numerically controlled oscillator (NCO) 1122. Of course another facility could be used to accomplish the oscillation, such as a voltage controlled oscillator (VCO) or digitally tuned oscillator (DTO). The microcontroller 1110 includes memory elements that hold data, such as a lookup table, that can convert a bit stream into the set of elements that are required to generate the appropriate input for the NCO 1122.

The microcontroller 1110 sends a signal to a device with a register 1128 that records values that reflect the desired width of the peak phase 1130, or Wb, and the event time 1132, t for the selected wave form. The width of the peak phase 1130 is then input into the Wb generator 1134. The microcontroller 1110 also sets up a ratio 1138 between the width of the peak phase 1130 and the event time 1130. That ratio 1138 can be used to generate another bit. Thus, the ratio 1138 can drive the event time 1130 (in contrast to other embodiments below in which the ratio is independent of other values). The microcontroller 1110 also provides input for determination of phase direction by a phase direction device 1140. This allows the wave form to be set either positive or negative, creating another potential bit of data. The Wb generator 1134 takes the input of the peak phase time 1130 and the ratio 1138 and determines how much total time will be taken up by this particular output. The input from Wb generator 1134 and the phase direction device 1140 are input to a Wb converter 1144, which, if necessary, can change the direction of the signal from the Wb generator 1134. Under control of the state controller 1112, the input is then prepared by a device 1148 for loading into the NCO 1122.

The NCO 1122 is a frequency-generating device that generates an output of choice. The NCO 1122 steps through various amplitudes in a fashion that will produce the wave form that is loaded into it. A low pass filter 1124 cleans up the signal, which is passed into a digital to analog converter 1128 for production of an HBDL signal. A sync tone 1150 feeds the DAC 1128 to provide an input to synchronize the receiving end of the signal. The sync tone 1150 could be a digital word or words that can be combined with the output from the NCO 1122 in the DAC 1128.

Figure 12:
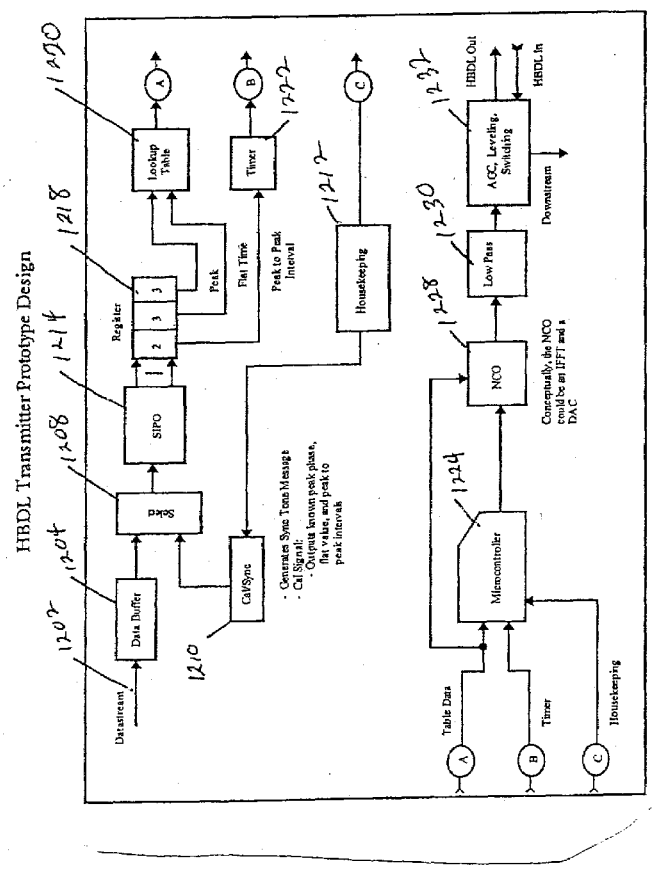
FIG. 12 is a simplified schematic of an HBDL transmitter.

Referring to FIG. 12, another single-frequency embodiment of an HBDL transmitter design is provided. Unlike the system of FIG. 11, the ratio test does not drive how the system outputs the signal. The embodiment of FIG. 12 is quite simplified. It could, for example, include additional signals, such as those for inverting the signal (as in FIG. 11) or for determining a ratio to generate another bit of information. In FIG. 12 a data stream 1202 is input into a data buffer 1204, which holds the stream before delivering it into a selector 1208. A cal/sync generator 1210 also feeds the selector 1208.

The cal/sync generator 1210 can generate a sync pulse to synchronize the transmitter with the receiver end of the system (not shown). The cal/sync generator 1210 can also generate instructions to instruct the system what to expect to see in terms of the maximum frequency. The cal/sync generator 1210 is controlled by a housekeeping device 1212. The housekeeping device 1212, among other things, sets up frames, recognizes turning the system on, sets up calibration and sync signals, and tests the transmission line to see what signal is received at the other end. The housekeeping device 1212 can be set to control the system to provide output up to a given frequency, including varying data rates. With varying data rates, the operator can set the system to output an appropriate data rate based on various parameters, such as what the customer paid for, the status of the line, or the like.

The selector 1208 takes input either from the cal/sync generator 1210 or the data buffer 1204 and feeds the signal through to a serial in, parallel out device 1214, which feeds a register 1218 that holds data that is fed to a lookup table device 1220 and a timer 1222. The lookup table device 1220 and timer process data from the register 1218 and determine, based on a lookup table or similar function, the output elements that are needed to generate the appropriate input for a microcontroller 1224, which feeds a numerically controlled oscillator 1228 the inputs it needs to generate a wave form or symbol that will be sent to the receiver side of the system. The output elements generated by the lookup table 1220 and timer 1222 include the peak-to-peak interval time for the signal, the flat time, and the peak phase. In embodiments they may include a ratio, as well as other elements, including amplitude elements, to generate more different signal bits. Output from the NCO 1228 produces the desired symbol or wave form, which is then filtered by a low pass filter 1230 and fed to a device 1232 for automatic gain control, switching, and leveling as needed for the line in question. Automatic gain control sets the signal at an appropriate level for transmission based on the loss characteristics of the line in question. The ADSL standard, T1.413, identifies loss characteristics of various loop types, and the automatic gain control device 1232 can generate an appropriate compensating element for the signal based on the line in question.

The HBDL transmitter design of FIG. 12 can operate at 8 bits/symbol or, at 1 Mhz at 8 Mbits/sec. The design of FIG. 12 only shows taking advantage of the in-phase component of phase (8 phases), and only uses 3 bits (8 flat widths) of flat and 2 bits (four time intervals) of peak-to-peak time. In reality, quadrature phase is available, a phase direction bit is available and two bits are available for the on to off ratio of the widths. Depending on what techniques are chosen, total available bits per symbol can be much greater than 8.

Figure 13:
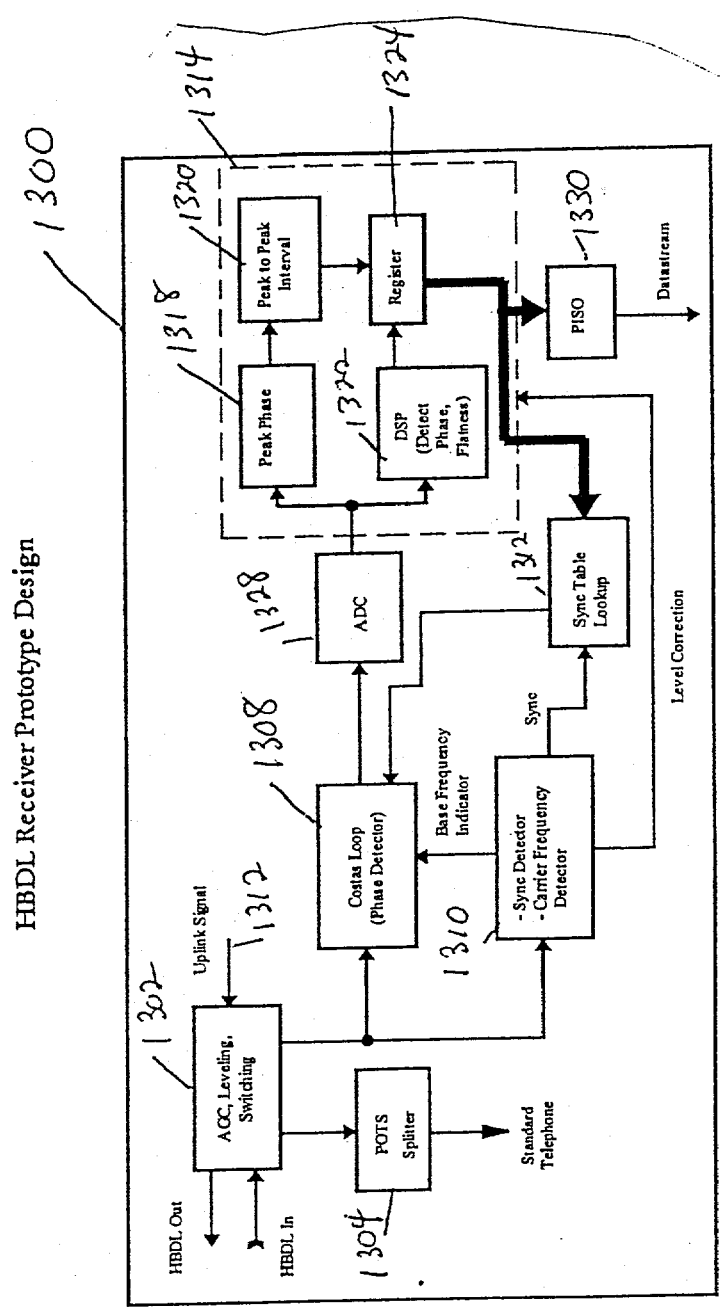
FIG. 13 is a simplified schematic for an embodiment of an HBDL receiver.

Referring to FIG. 13 a schematic is provided for an HBDL receiver 1300. The data stream from the transmitter 1200 is received in an automated gain control device 1302 which communicates with the transmitter 1200 to set an appropriate level of power gain, leveling and shaping for good communication on the line in question. The AGC device 1302 gets a signal from the transmitter as well as an uplink signal 1312. The receiver 1300 may include a splitter 1304 that allows the line to be shared with a standard telephone. The receiver 1300 includes a phase detector 1308, which may be a Costas loop (a self-synchronizing phase detector). The receiver 1300 also includes a second detector 1310 that detects the sync signal from the transmitter 1200 and detects the frequency of the carrier wave. The detector 1310 is used during synchronization time. When synchronization starts, the detector 1310 provides a sync signal to a sync table lookup device 1312 and to a group of devices 1314 that calculate peak phase 1318, peak to peak interval 1320, as well as phase and flatness 1322, then feed them into a register 1324. Out of the register the calculated values are fed into the sync table lookup device 1312. The system is set up to know exactly what signals to expect as soon as the synchronization time is determined to have started. Upon acknowledging the synchronization, the system looks at the known calibration data and processes that as a normal set of data, sees what the result of that data is, and adjusts itself if the data is not what it thought it was. The data is fed from the sync detector into the block 1314 that determines various elements for the calibration signal, which output data to the sync table lookup device 1312, which feeds the phase detector 1308 to adjust the detected phase in a feedback loop to reflect what the phase should be given the calibration signal.

The phase detector 1308 (an oscillator in a phase-locked loop) receives the signal and synchronizes its oscillator to the incoming signal. The resulting error signal that the phase detector 1308 generates is the phase of the detected signal. The output is thus the phase variation of the incoming signal. A Costas loop phase detector 1308 is an off-the-shelf device that is well known to those of ordinary skill in the art. The output of the phase detector 1308 may go into a filter before going into an analog to digital converter 1328. which then passes the signal to the block 1314 for determination of peak phase, peak to peak interval, phase, flat time by the various subdevices of the block 1314 for storage in the register 1324. The block 1314 may include elements that provide state control for the register 1324. It could include other embodiments that calculate ratios and other values for producing additional bits of data from the signal. The output of the register 1324 is fed to a parallel in, serial out (PISO) device 1330, which produces a data stream that matches the data stream that was entered into the transmitter 1200.

The embodiment of FIG. 13 uses a Costas Loop to detect the incoming phase components from the transmitter. In other embodiments, the transmission and detection of peak phase and flat time information can be performed by an IFFT/FFT combination to keep the design digital, and to allow for greater simplicity. It could also be implemented by coherent phase detectors and other known facilities for detecting phase. The IFFT/FFT combination will be capable of different size frequency cells, such as 4 kHz frequency cells or 40 kHz frequency cells. The use of 40 kHz cells will reduce the frequency cell requirement so that only 25 cells would be required for a system implementation. The advantage of having 40 kHz (or any cell size greater than 4 kHz) is increased simplicity. The disadvantage is the requirement of packing more information per cell to maintain maximum bit rates. There will also be a decrease in system granularity, although bit rate reduction would still be in the range of 32–40 kbits/sec. The difference being, HBDL will resist interference longer and operate at higher rates over longer distances than will QAM systems.

Figure 14:
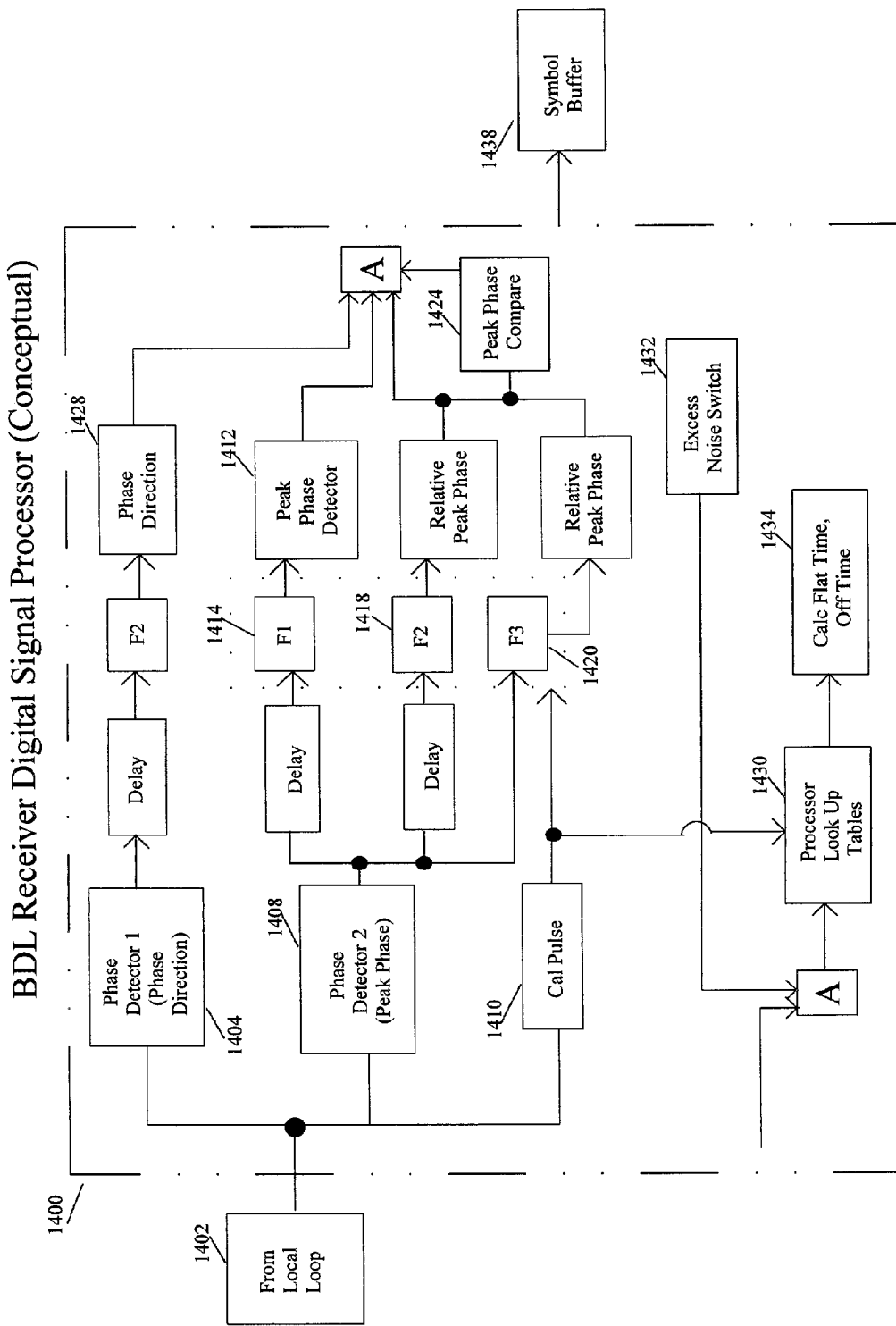
FIG. 14 is a simplified block diagram for an HBDL receiver embodiment.

FIG. 14 is simplified block diagram for an HBDL receiver 1400. Data 1402 transmitted from an HBDL transmitter is received by the receiver and fed into a phase direction detector 1404, a phase detector 1408 and a calibration pulse detector 1410. The calibration pulse detector 1410 recognizes a calibration or sync pulse from the transmitter and synchronizes the receiver with the timing of the transmitter, such as at the beginning of a frame of data. The normal mode of operation of the receiver is to determine the value of peak phase and measure each of a set of parameters to determine which bit has been received.

The receiver 1400 measures the peak phase in the incoming signal. In a low noise environment, this is accomplished by a peak phase detector 1412 that receives the signal after it is filtered by a first filter 1414. The amplitude of the output of the filter 1414 bears a direct relationship to the peak phase at the transmitter. When the noise environment disturbs this measurement, this measurement of peak phase measurement becomes unreliable. Then, the system uses a different approach, which is to obtain a relative peak phase reading from the filter 1418. The calibration of the system (as described below) allows the correction of the output from the filter 1418 to account for noise, obtaining a more reliable measurement of peak phase.

It is also desirable to measure flat time (the time the peak is flat). Flat time, as it affects the amplitude level of the Bessel filters, is quite sensitive to noise. Since this value is related to both peak phase and flat time, in an environment with noise only the measurement of relative flat time is resolvable. Relative Flat Value (RFV) is equal to the value measured after coming through the first filter 1418 minus that measured from the second filter 1420. The resolvable voltage difference between the filters 1418, 1420 is repeatable because they are set up to track one another in a noise environment. The two filters 1418, 1420 can be Bessel filters. This is a very repeatable measurement, even when the signal to noise ratio (SNR) is poor. RFV can contribute 2 or more bits even at a SNR less than that which could give a bit error rate of $10^{-7}$ or better with normal peak phase measurements. By using two filters, e.g., Bessel filters, with different response times, it is possible to get a conditionally reliable measurement of relative flat time even if the normal flat time is disturbed, assuming everything else is constant except flat time.

In FIG. 14 the filter 1414 is a very fast filter. Once noise affects the signal, the system needs to switch to the other two slower filters 1418, 1420. The filter 1418 captures the peak for the period of time between one peak and the next peak. The filter 1420 is a slower filter that yields a similar wave shape to the filter 1418 but at a lower level. Once peak phase is affected by noise, it starts to move around in level and becomes difficult to resolve by a single filter. However, the two filters 1418 and 1420 move around together, because they both receive the same noise input. (It is also possible to compare one of these filters 1418, 1420 to the first filter 1414. Thus, the relative difference between the two is resolvable even if there is noise, if the filters are set appropriately to receive the same noise. The resolvable value obtained by comparing the two filters with a comparator 1424 is the area under the curve, or the flat time of the signal. As we change the flat time, the distance between these two curves changes. That distance remains resolvable when measured as the difference between how two filters of different speeds read the signal, even though it is not possible to tell what flat time is just by looking at the output of one of the filters. In embodiments the filters 1414, 1418, 1420 may be Bessel filters. One may be a low pass Bessel filter with a cutoff frequency of 600 Hz, with the others at different cutoff frequencies.

For the fast filter 1414 to find the peak of the incoming signal in a low noise environment, it is necessary to establish an algorithm to look for the outcoming signal and determine whether it is increasing. As soon as it is not increasing, the system can set a bit (with the time of the stop in increase). When the output starts decreasing, then system can set a bit with the time when the signal started to decrease. The system defines the peak time as the midpoint of those two bit times. A pipeline, buffer, or similar facility is needed to accept the output of the fast filter 1414 (e.g., a finite memory element that has been calculated to be large enough to hold a block of data that will not be overflowed). The memory holds the data from the filter 1414 (or any other filter we use) long enough so that when the system sets the final bit it still holds the time of the initial bit in memory.

When there is noise, the fast filter 1414 won't produce a good measurement of the peak phase, so one of the slower filters 1418 or 1420 is used. If the system applied same algorithm to one of the slower filters 1418 or 1420 a problem results, because the filter delay may cause the output to miss the peak of the pulse, because the next pulse may be going down after a peak has been missed. So, the system needs to apply a peak detection algorithm to the output of the filters, essentially seeking the real peak from the apparent behavior of the output of the slower filters, such as by seeking a midpoint of the values of smaller oscillations over time. Thus, the system looks backward and sets the point at which it stopped going up and started going down. The system can then use a lookup table or similar mechanism to account for the effect that noise is having on the filter in question (based on values obtained from calibration as described elsewhere herein).

Once the system has determined the peak phase for two consecutive sub-frames, it can compare the times and determine the peak-to-peak time.

Measurement of the relative flat time also allows use of another parameter, which is a ratio test. The ratio test uses a ratio of flat time to event time, then multiplies it by the peak to peak time (FT/ET)*PPT. This ratio test provides another potentially orthogonal variable. Once the flat time and peak to peak times are known, a test can be performed to determine a ratio, (FT/ET)*PPT. Sync pulses can be used as a means of implementing the ratio test. One value of the ratio test is that it can be used to gain another bit in cases such as when some resolution is lost in one of the associated bits, such as peak-to-peak time, PPT, flat time, FT, or both.

The signal from the comparator 1424 can be combined with a signal from a phase direction detector 1428 and fed into a processor 1430 that contains lookup tables for resolving various values based on the measured variables. A switch 1432 controls the processor to make calculations based on whether or not the environment contains a predetermined level of noise at a given frequency.

The lookup tables allow calculation of the various parameters by a calculator 1434, which can send appropriate data bits, based on the outcome of the lookup tables, to a symbol buffer 1438.

At this point we see that an HBDL system, using simple steps in frequency or variations in phase, can generate wave forms or symbols that allow resolution of at least the following characteristic values for different noise conditions:

1. Flat Time (FT), Relative Flat Time (RFT)
2. Phase Time (PT), i.e., Peak Phase or Relative Peak Phase
3. Peak to Peak Time (PPT)
4. Ratio Tests (e.g., (FT/ET)*PPT)
5. Amplitude Each of these characteristic values can be resolved into one or more bits of data. The first two values can be determined directly. In some cases, the number of bits assigned to a given value is optionally quite large. For example, the second characteristic value, PT, or peak phase, can be any resolvable range of values from one phase angle to another. In fact, if desired, one could allow the phase to change to values greater than 360°. Of course, that being said, the presence of this change needs to be detected. By using a well-known technique known as phase unwrap, the relative phase values greater than a given level can be discerned and used as a basis for distinguishing one symbol from another based on the different peak phase values.

In addition to the values above, it is possible to get another quadrature component using I and Q.

The system can send standard signals to the two filters and observe how they react, allowing the system to know what a typical signal looks like in that particular noise. This allows the system to measure at the receiving end the starting time of an event, based on the occurrence of resynchronization at a particular time. The clock time used for resynchronization is also used for time-based measurements such as the ratio test.

In embodiments the system knows when an event occurs relative to the clock transition. The clock is running and a signal is generated on a clock transition. Based on the clock time, it is possible to measure how many clock pulses have gone by for a transition to the next transition and to measure the time of the peak. The ratio provides a measure of the ratios of certain characteristic values of the wave form. For example, the system can observe the ratio of the flat time to the event time in a generated signal. When multiplied by an observed peak-to-peak time, this ratio provides another highly resolvable bit of information.

Amplitude bits are also resolvable, although not required, in HBDL. In embodiments, using an oscillator such as a voltage controlled oscillator, numerically controlled oscillator, IFFT, or the like, it is possible to generate as many resolvable degrees of phase change as desired, not stopping at three hundred sixty degrees. Thus, it is possible to get multiple peak phase data bits within the same period of time. It is also possible to vary the amplitude of a VCO, DTO, or other frequency source, which can be changed as the phase is changed. Thus, like a QAM system, it is possible to use the HBDL system to generate a number of resolvable amplitude bits (which, unlike some of the other characteristic values of HBDL, is more susceptible to noise). Because the number of phase bits can exceed those that fit within the three hundred sixty degree limitation of QAM, the combination of amplitude and phase bits provides a potentially greater number of bits per symbol than a QAM constellation and a much greater number of bits per symbol when adding in peak phase, peak-to-peak time, flat time, direction and ratio. If this is done using In-phase (I) and Quadrature (Q) bits, then it is possible to get still another bit for the Q component.

In the case of HBDL, the in-phase and quadrature elements can be collected separately. Because they are represented as a complex function they need to be added together to be sent out. At the receiving end the system reverses the adding function and can resolve the amplitudes associated with the In-phase and Quadrature components. Although HBDL systems do not require resolution of the I and Q components, when they are resolved, the system can obtain another bit of data from a transmitted symbol.

Figure 15:
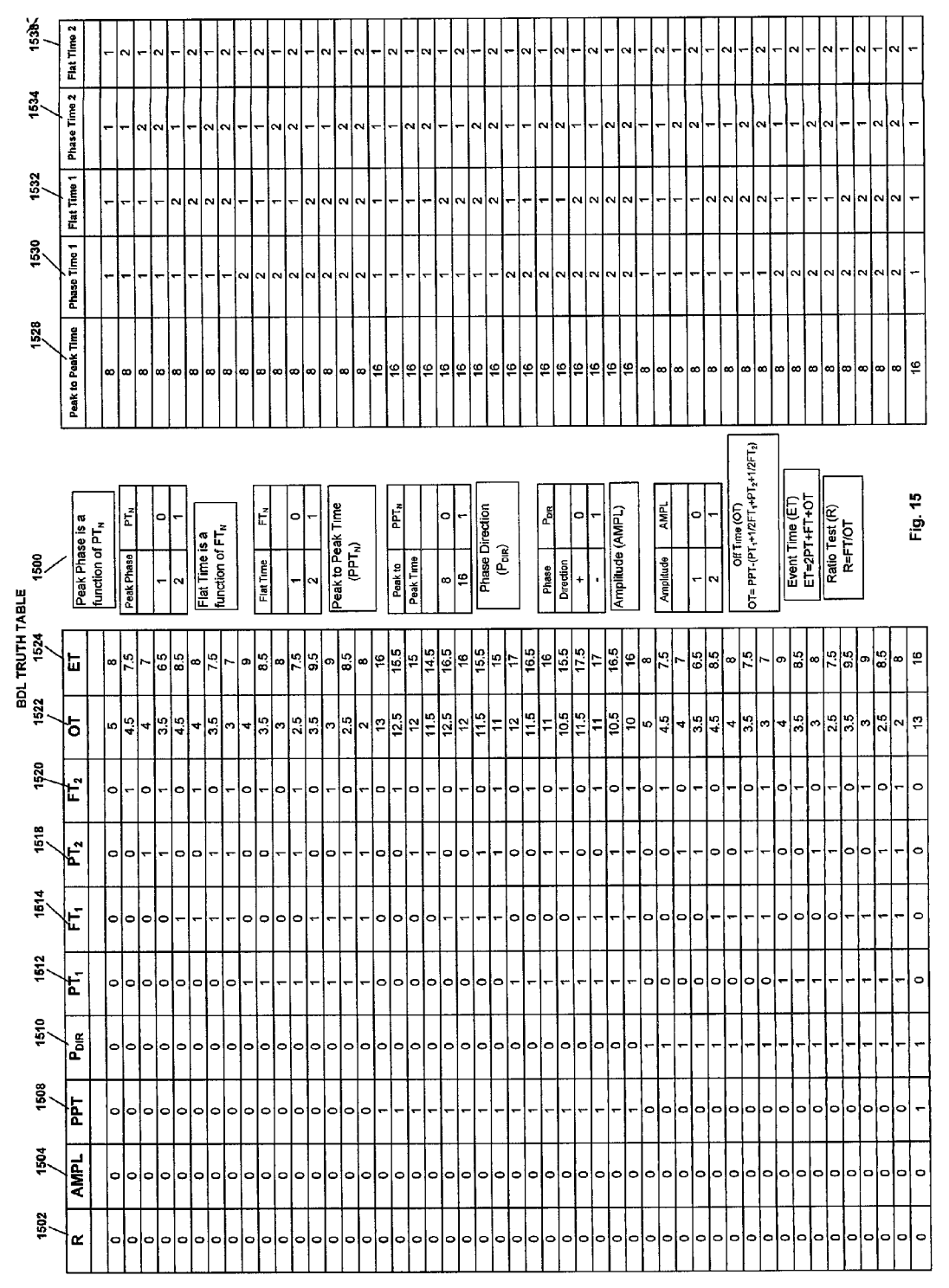
Figure 16:
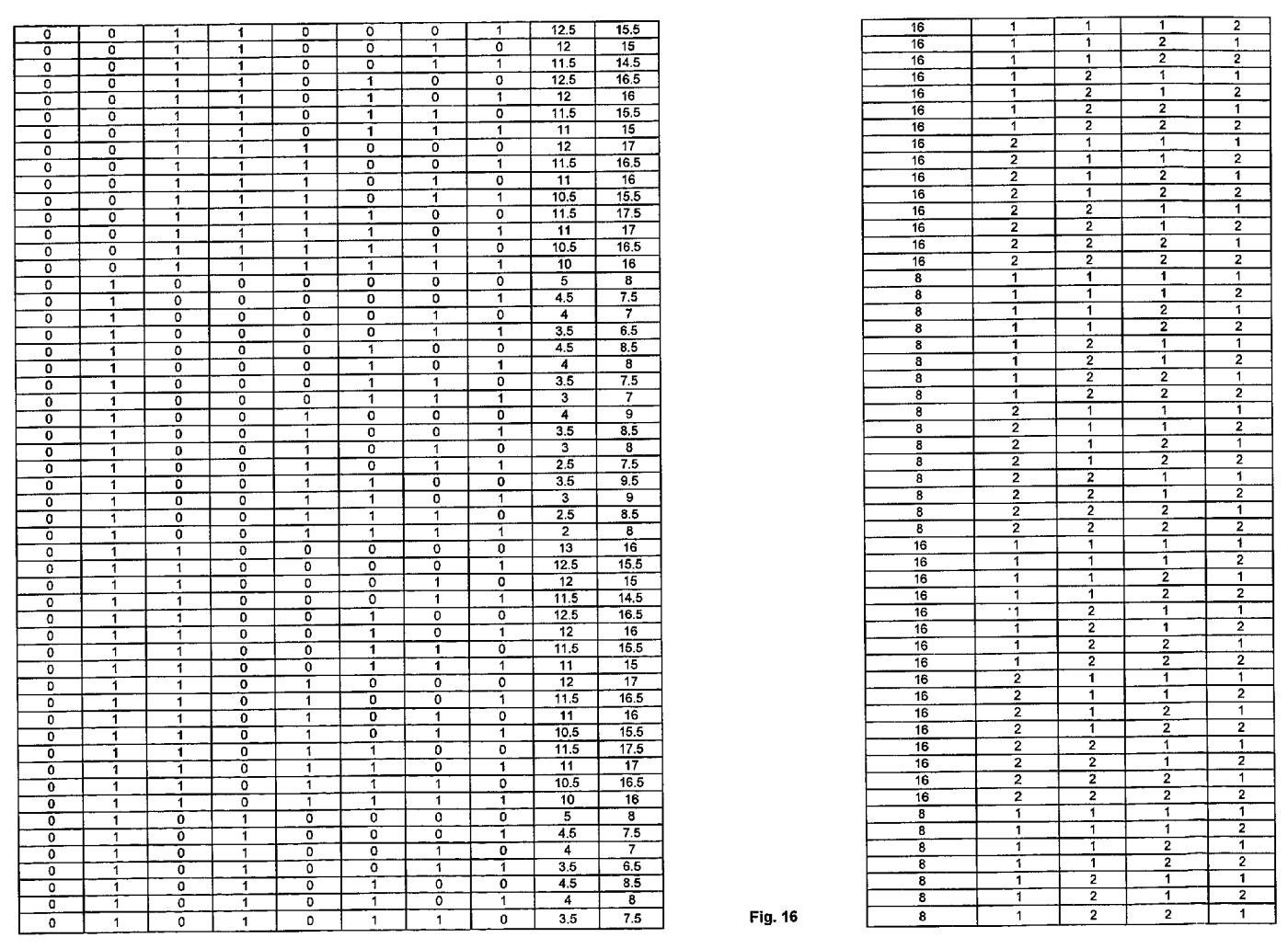
Figure 17:
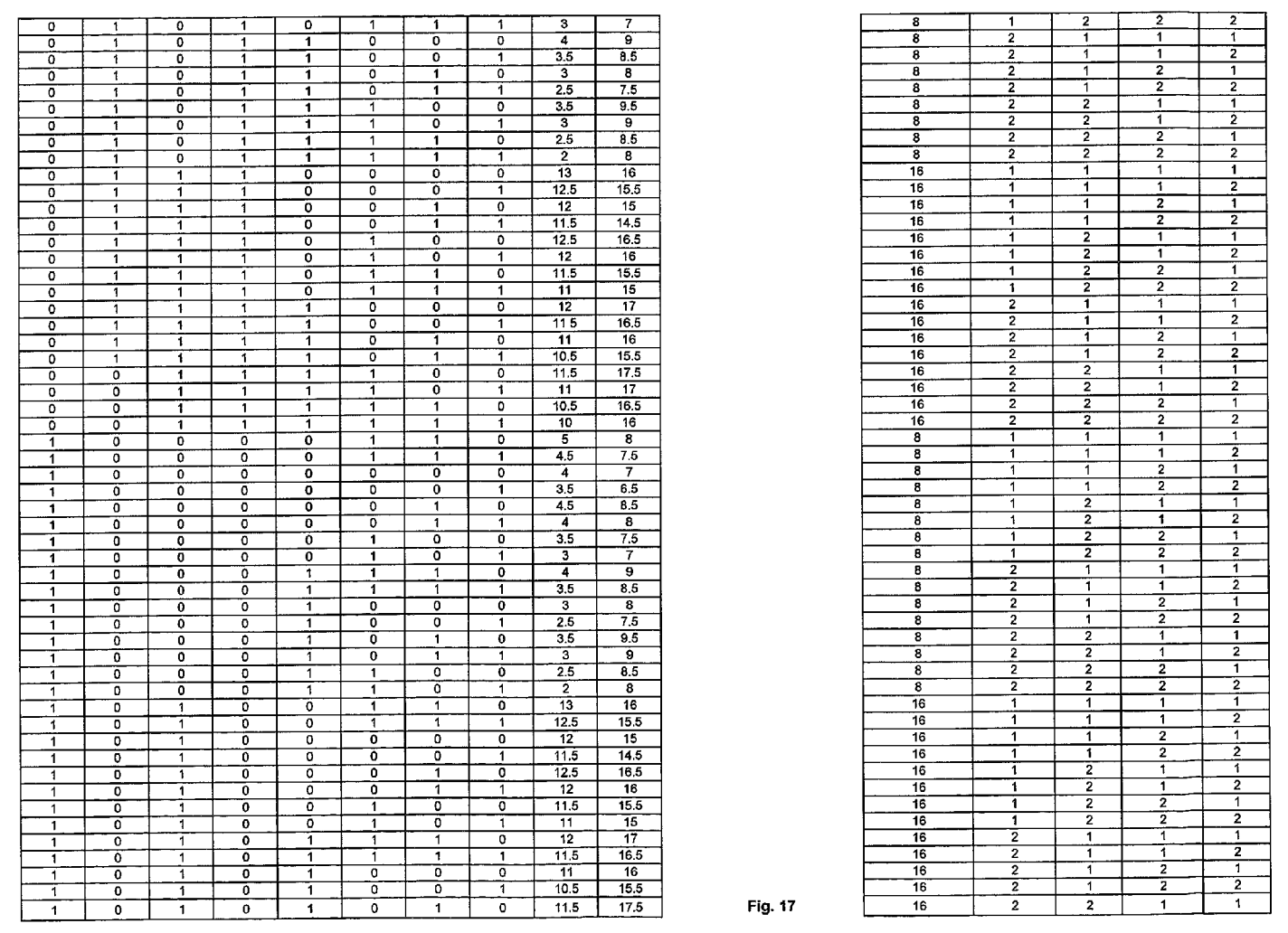
Figure 18:
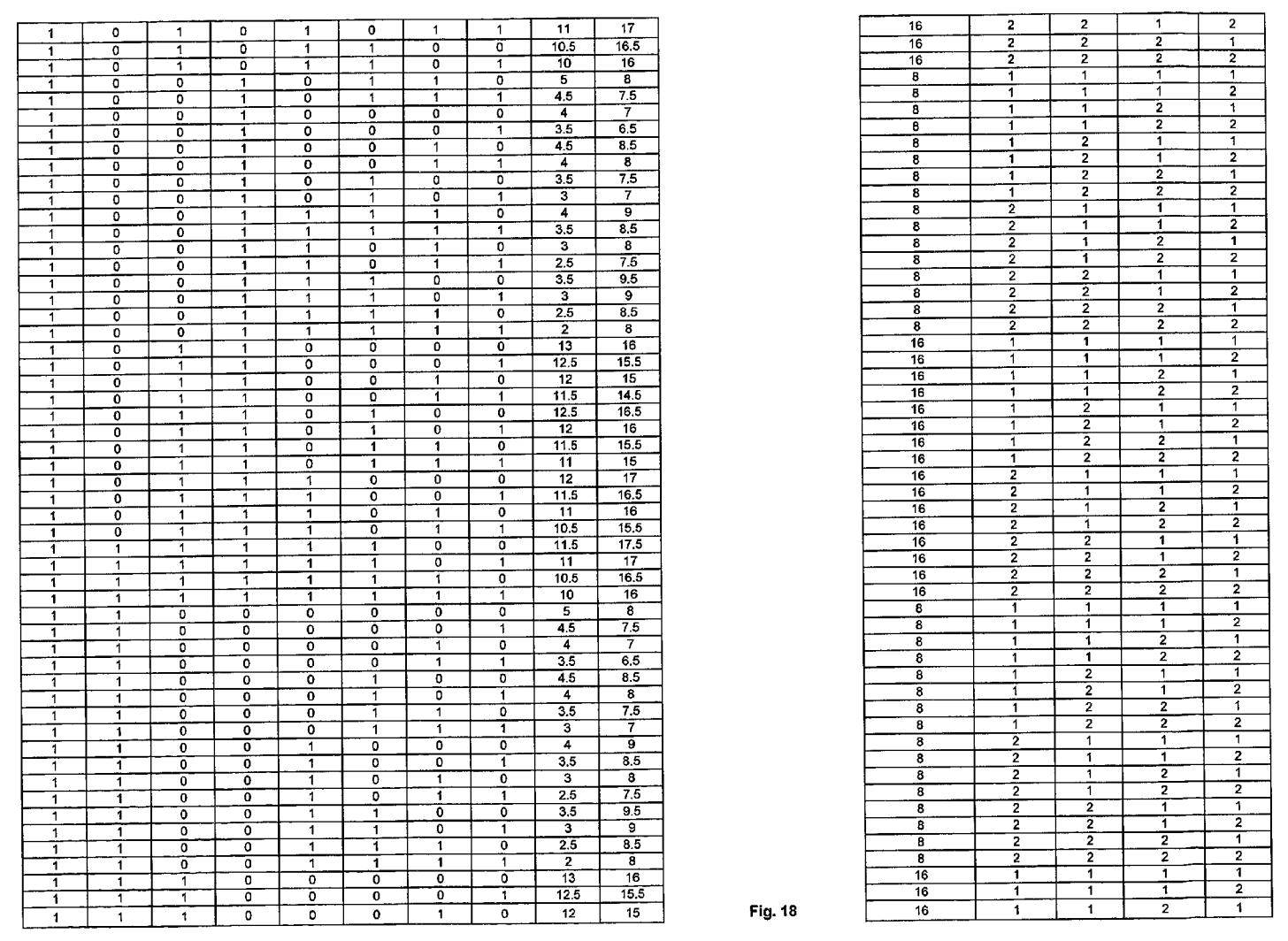
Figure 19:
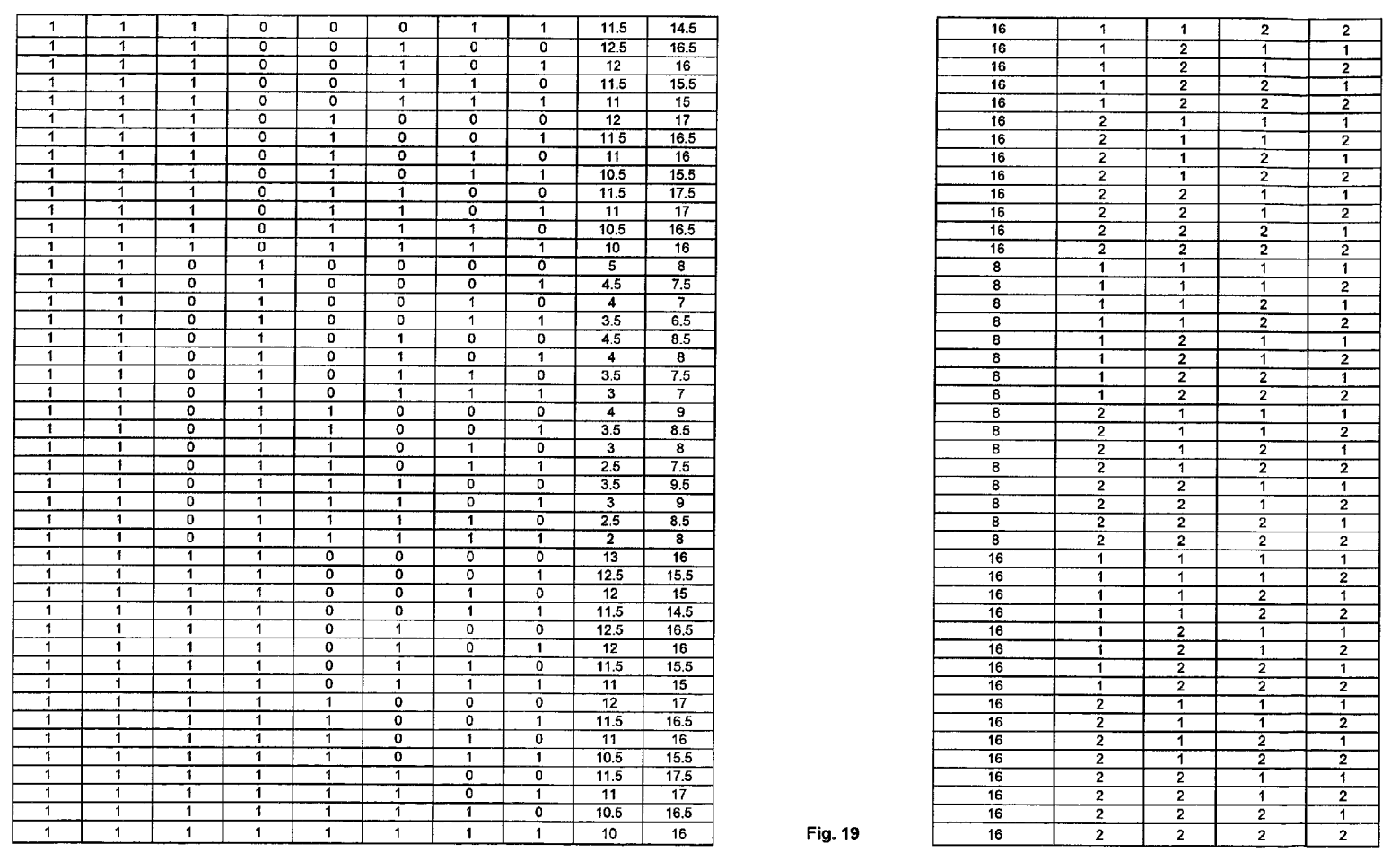

FIG. 3 showed a simple truth table for a QAM system in which phase and amplitude values were used to generate a constellation of resolvable data bits. Because the HBDL systems and methods described herein have more resolvable characteristic values, and each of those values has the potential to be resolved into sub-values, an HBDL system offers the capability of generating much higher bit rates from a simple signal. FIGS. 15–19 show a truth table 1500 for an HBDL system in which a single bit is assigned to each of the characteristic values of an embodiment of an HBDL symbol. Of course, a much more complex table with more available bit values would be produced by assigning multiple bits to a given characteristic, rather than just one, and bits could be assigned to Inphase (I) and Quadrature (Q) components if desired. In FIG. 15, it can be seen that bits are assigned based on the presence of a zero or one value in each of a ratio test R 1502, an amplitude A 1504 (an optional bit that doesn't have to be used in HBDL, or could be used only in low-noise environments), a peak to peak time PPT 1508, a phase direction PDir 1510, two peak phases PTn 1512 and 1518, and two flat times FTn 1514 and 1520. The two peak phases PTn 1512, 1518 and flat times FTn 1514, 1520 reflect measurements obtained from adjacent symbols; that is, the peak phases and flat times are used as a basis for calculating values that require calculating the differences between two symbols, not just a characteristic of one symbol. Based on the other values it is also possible to derive two other independent variables, off time 1522 and event time 1524, although these are not assigned separate bits in this embodiment of the truth table 1500. The underlying signal values that generate the values for the assigned bits are shown in the right hand columns of the truth table 1500. These include the peak to peak time 1528, phase times 1530 and 1534, and flat times 1532 and 1538. The formulas in the center column of the truth table 1500 show the assignment of bits to the variables based on the values in the right hand portion of the truth table 1500.

The simplified truth table 1500 thus permits generation of an eight bit symbol based on a single bit from each of the values of the wave form about a single frequency. By adding many frequencies (in a DMT-like embodiment) and by adding more bits for each of the characteristic values (e.g., more bits for flat time, more for peak time, more for peak-to-peak time, more for amplitude), it is possible to generate a very high data rate from these characteristic values of a simple symbol form such as depicted in FIG. 9. In embodiments, different truth tables may be used depending on the number of bits desired, the noise environment, and the like, or the truth table 1500 could be viewed as a subset of a larger truth table. For example, a given physical value may be measurable within very close tolerances in a low noise environment, thus allowing resolution of a several bits from slight variations in physical values. In a high noise environment it might only be possible to distinguish between high and low, providing just one bit of information. The lookup tables described throughout this disclosure can be made capable of relying on more, or fewer bits, based on a number of factors, such as the noise levels at particular frequencies, overall noise levels, number of bits required for a data stream, or the amount the customer pays for a given version of HBDL. For example, a system might have course, medium, and fine lookup tables that are used based on high, medium and low levels of noise measured in the transmission line. In embodiments there could be many degrees of granularity.

It should be understood that values that are used as inputs to encode a symbol using the transmitter side of an HBDL system are not directly measurable at the receiver side. For example, the transmitter can generate signals by turning particular frequencies on and off in a cell at specified times, but what is measurable at the receiver end are characteristics of the generated symbol or wave form. The truth table is used to translate between the physical values generated at the transmitting side and the expected values measured at the receiving side. In some cases the prediction may be mathematically difficult. Thus, the system operator may desire to calibrate the interaction between transmitter and receiver in an iterative process in a closed loop, no noise system. In such a process, the operator sends a signal of known characteristics from the transmitter to a receiver, then measures the output from the receiver. If the output does not initially match, then the truth table is adjusted iteratively until the input stream matches the output stream. Once calibrated, the system can store the modified truth table. The truth table can be embodied in a software, downloadable form, such as using a field programmable gate array or other suitable mechanism. Thus, adjustments can be made to installed transmitters and receivers in the field, such as adding different bits of information for a different embodiment of HBDL than was purchased at the time of installation.

In the calibration process, the system operator can define a given receiver's function in a lookup table by sending a known signal and observing what the receiver actually finds in an iterative loop. This avoids the need to calculate a very complex transfer function. Instead, at system setup it is possible to set the receiver's lookup function based on observation of what it receives when the transmitter sends a known signal.

Figure 20:
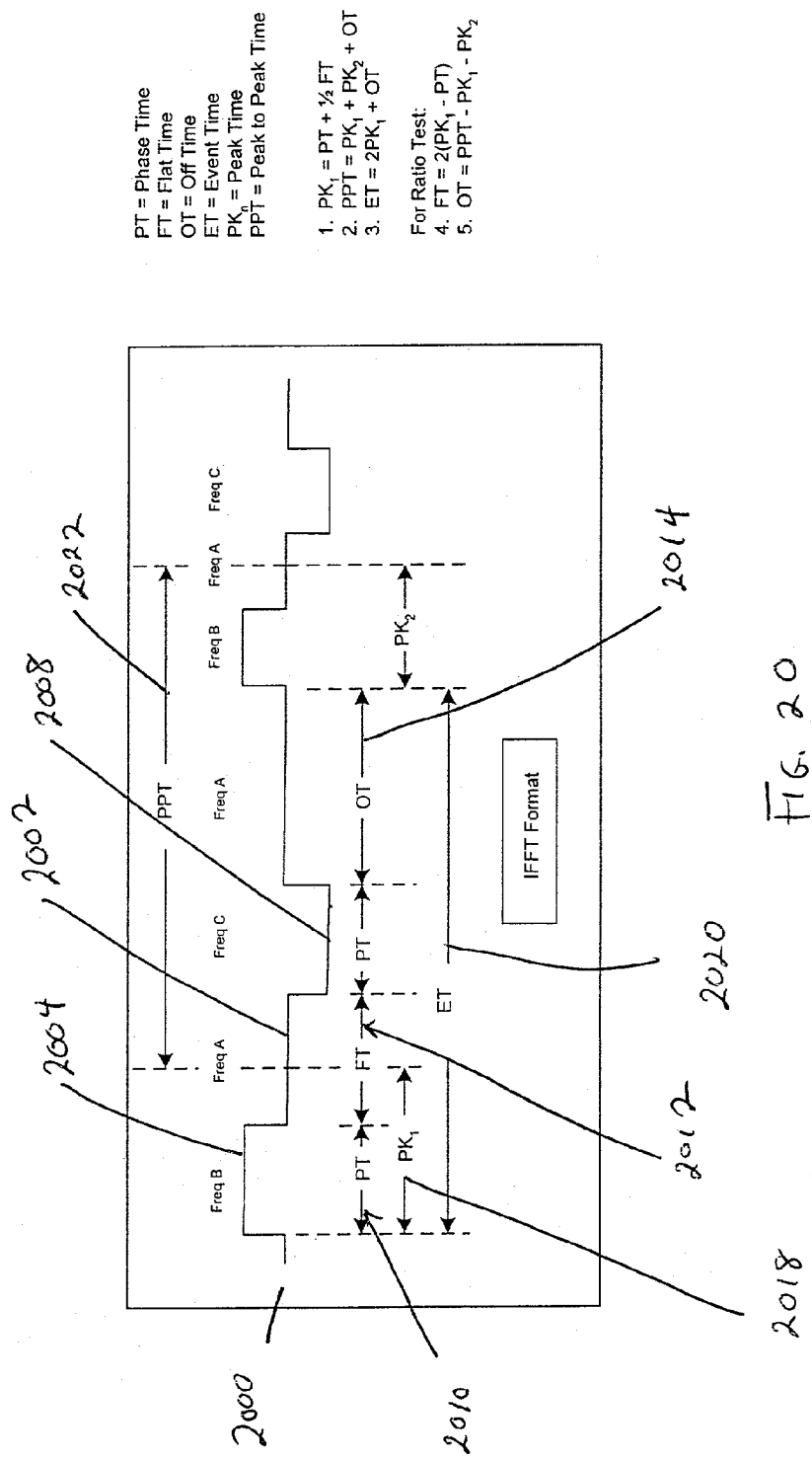
FIG. 20 shows a simple step function for an oscillator to generate an embodiment of an HBDL symbol.

FIG. 20 shows a simple step function 2000 for an oscillator to generate a wave form or symbol that has the characteristic values needed to generate data bits according to a truth table like the truth table 1500 of FIGS. 15–19. This is one of many potential BDL implementations. In FIG. 20, the horizontal direction represents time, and the vertical direction represents frequency of an oscillator used to generate a phase-varying frequency function. The oscillator oscillates at one of three frequencies, a base frequency A 2002, a higher frequency B 2004 and a lower frequency C 2008. During an event time the tone generator is comprised of a grouping of for example three mutually exclusive frequencies stepping from the base frequency to a lower (or higher) frequency then back to the base and then to the higher (or lower) frequency, completing the event time by returning to the base frequency, in the appropriate fashion to create the BDL tone. For example, during the event time shown in FIG. 20, the oscillator is stepped from the base frequency A 2002 up to the higher frequency B 2004, returned to the base frequency A 2002, then stepped down to the lower frequency C 2008 for the same period of time as it was stepped up to the higher frequency B 2004. Then it is returned to the base frequency A 2002 for the duration of the cycle. The process is repeated after a predetermined time at the base frequency A 2002.

As can be seen in FIG. 20, the variables used to generate values for the truth table are represented. The phase time 2010 is the time at which the oscillator is at the higher frequency B 2004. The flat time 2012 is the time it is returned to the base frequency A 2002 before being lowered.

The off time 2014 is the time the oscillator returns to the base frequency A 2002 before starting another cycle. The peak time 2018 for a given cycle is the phase time 2010 plus one half of the flat time 2012. The event time 2020 is the time for the entire cycle. The peak-to-peak time 2022 is the sum of the peak times for two consecutive cycles plus the off time between cycles. Defining the symbol in frequency and time space allows use of frequency-based methods for decoding the symbol, such as a fast fourier transform (FFT)/inverse fast fourier transform (IFFT) combination. This would be useful in a digital signal processing embodiment of an HBDL system.

It should be understood that forms such as shown in FIG. 9 and FIG. 20 can be generated using a variety of known techniques, such as a numerically controlled oscillator (NCO), voltage controlled oscillator (VCO), Inverse Fast Fourier Transform (IFFT), combined FFT/IFFT, and others known to those of ordinary skill in the art. Using an IFFT may be preferable in some circumstances to provide an entirely digital system. The IFFT allows the system to take in a string of parallel digital words and use them to generate all desired frequencies.

Certain parameters used in the HBDL methods and systems are very robust in the presence of noise. For example, the peak to peak time and peak phase parameters are not nearly as susceptible to noise as QAM signals. However, because some parameters, such as flat time, are more susceptible to noise, it is still desirable to have some error correction facility. Since any parameter cannot be relied upon once an interfering condition such as noise makes it an unresolvable value, techniques may be employed to try and prevent the interference from affecting the parameter. As discussed above, common techniques to combat this problem in QAM systems are Reed-Solomon Coding, Convolution or Trellis Coding and Continuous Wavelet Transforms. These techniques can be used to improve resolution in an HBDL system as well. Chipsets to produce encoding for ADSL and other DSL systems are well known. An example is the Apollo 1 Chipset produced by Integrated Telecom Express, Inc. The product data sheet for the Apollo 1 chip set is widely available and is incorporated by reference herein.

Reed-Solomon Coding adds a finite number of check bytes to the transmitted signal. For example, if 16 check bytes are transmitted, up to 8 byte errors are correctable. This allows that for burst noise or noise conditions where noise effects are marginal, data errors can be corrected.

Trellis coding adds bit redundancy while repositioning the data stream to prevent sequential errors. The combination of Trellis Coding and Reed-Solomon Coding yields a SNR increase.

Continuous Wavelet Transforms are based on Wavelet Theory and achieve the objective of removing the noise encapsulating a signal. A wavelet transform gives both the time and frequency components of a signal. A time-scale representation of a digital signal is obtained using digital filtering techniques. The CWT is a correlation between a wavelet at different scales and the signal with the scale (or the frequency) being used as a measure of similarity. The continuous wavelet transform is computed by changing the scale of the analysis window, shifting the window in time, multiplying by the signal, and integrating over all times. In the discrete case, filters of different cutoff frequencies are used to analyze the signal at different scales. The signal is passed through a series of high pass filters to analyze the high frequencies, and it is passed through a series of low pass filters to analyze the low frequencies.

The transform provides an output representative of a given signal without the noise component present. Using a CWT enables the removal of a given signal from unwanted components such as noise. A signal 20 dB into the noise can be extracted and its information processed.

Figure 21:
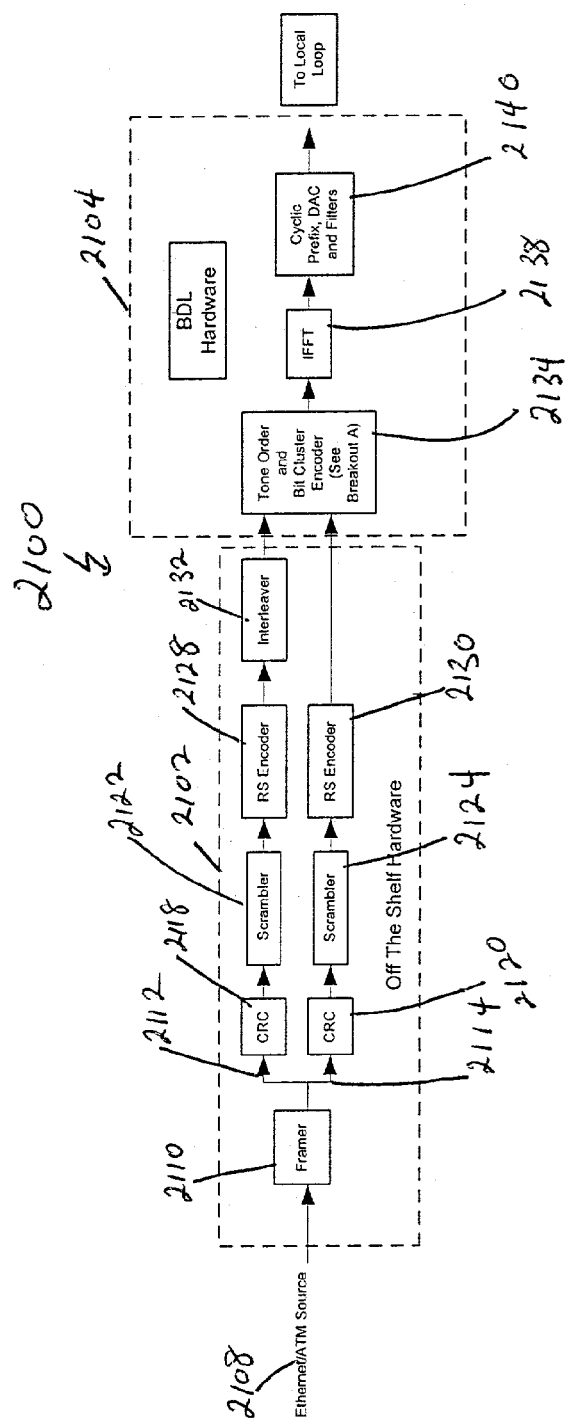
FIG. 21 is a schematic diagram of an HBDL transmitter embodiment.

FIG. 21 shows a schematic diagram 2100 of hardware for HBDL transmission. The hardware consists of a configuration 2102 of standard hardware similar to what is used in DMT systems, as well as a configuration of HBDL hardware 2104 for encoding the HBDL signal. A data stream 2108, usually an Ethernet or asynchronous transfer mode (ATM) source is fed into the configuration 2102. Initially it is fed into a framer 2110, which may be a framer for a DMT signal such as described in the ANSI T1.413 standard or a different framer designed to produce customized frames for HBDL transmissions. The framer 2110 frames the signals within time cycles. Next the data stream 2108 is fed into two error correction branches 2112 and 2114. The first branch provides for interleaving of the data and the second does not. The data in each branch is fed into an encoder 2118, 2120 that generates CRC codes for error correction at the receiver end. The data may also be fed into a pair of scramblers 2122 and 2124 and a pair of RS encoders 2128, 2130 for further encoding. The data in the branch 2112 can be fed into an interleaver 2132. A wide variety of software and hardware processes can be used to accomplish the encoding functions, as used in known DMT and DSL systems. The encoded data streams can be fed into the HBDL hardware configuration 2104, including an encoder 2134 for encoding the data streams with the characteristic values described above, an IFFT 2138 for performing an inverse fast fourier transform, and a device 2140 for applying a prefix, converting to an analog signal, and applying appropriate filters. The signal is sent then to the line. The hardware configuration 2104 is described in more detail below.

Figure 22:
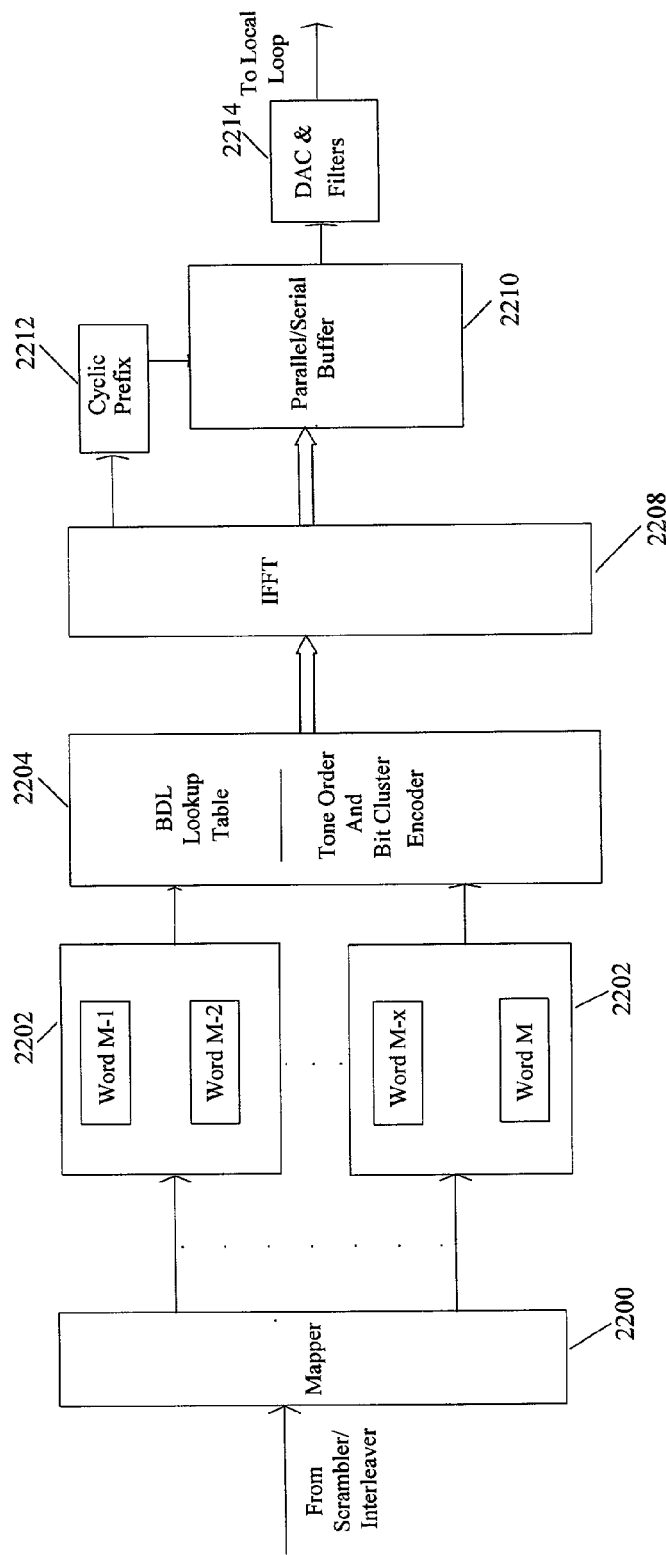
FIG. 22 is a schematic diagram for an embodiment of an HBDL transmitter.

Referring to FIG. 22, a schematic diagram is provided showing the hardware configuration 2104 of an HBDL system transmitter. Data from the encoder/scrambler/interleaver are fed first into a mapper 2200. The mapper 2200 decides how the data bits will be arranged into a plurality of data words 2202. The number of words equals the number of frequencies that will be generated in the BDL system. The number could be 256 (the standard number for DSL systems now), or another number. Because part of the data used by the lookup table is based on differences between one event and the successive event, it is desired to input two words (associated with two events), both the word of interest and the successive word, into the lookup table. The data is then addressed into a lookup table 2204. The lookup table reads a word or words (associated with events) and builds elements of the symbols that will be required to generate these words. Those elements are the ones described herein, including starting times, event times, flat times, off times, peak phase times, and the like. Each of those elements is, through an algorithm of the lookup table, translated in turn into a series of tones and the times at which the tones are turned on or off. The lookup table 2204 generates the list of frequency tones, as well as the times at each tone, needed to build a the desired symbol that corresponds to that word in the truth table for BDL. The lookup table and tone order and bit cluster encoder 2204 is similar to that used in a conventional QAM-based DSL system, but there is the additional complexity that for each frequency region, BDL uses, nominally, three mutually exclusive frequencies (a base, high and low), each of which is turned on or off for periods of time. For this example we use a base, high and low, but more frequencies could be used to generate a similar symbol. Thus, the lookup table 2204 calculates more different frequency tones and times than in QAM systems. The lookup table 2204 thus generates tone and time information for each data word and sends the tone and time data to the IFFT 2208. The IFFT 2208 takes the frequency domain information and converts it into time domain information. The IFFT then feeds the cyclic prefix generator 2212 which adds information to allow equalization of information at the receiving end in a manner similar to that done in conventional DSL systems. The IFFT 2208 also feeds the parallel in, serial out buffer 2210, which produces time domain information in a serial stream. That stream is fed into a digital to analog converter 2214 to generate the analog signal that is fed to the local loop.

Figure 23:
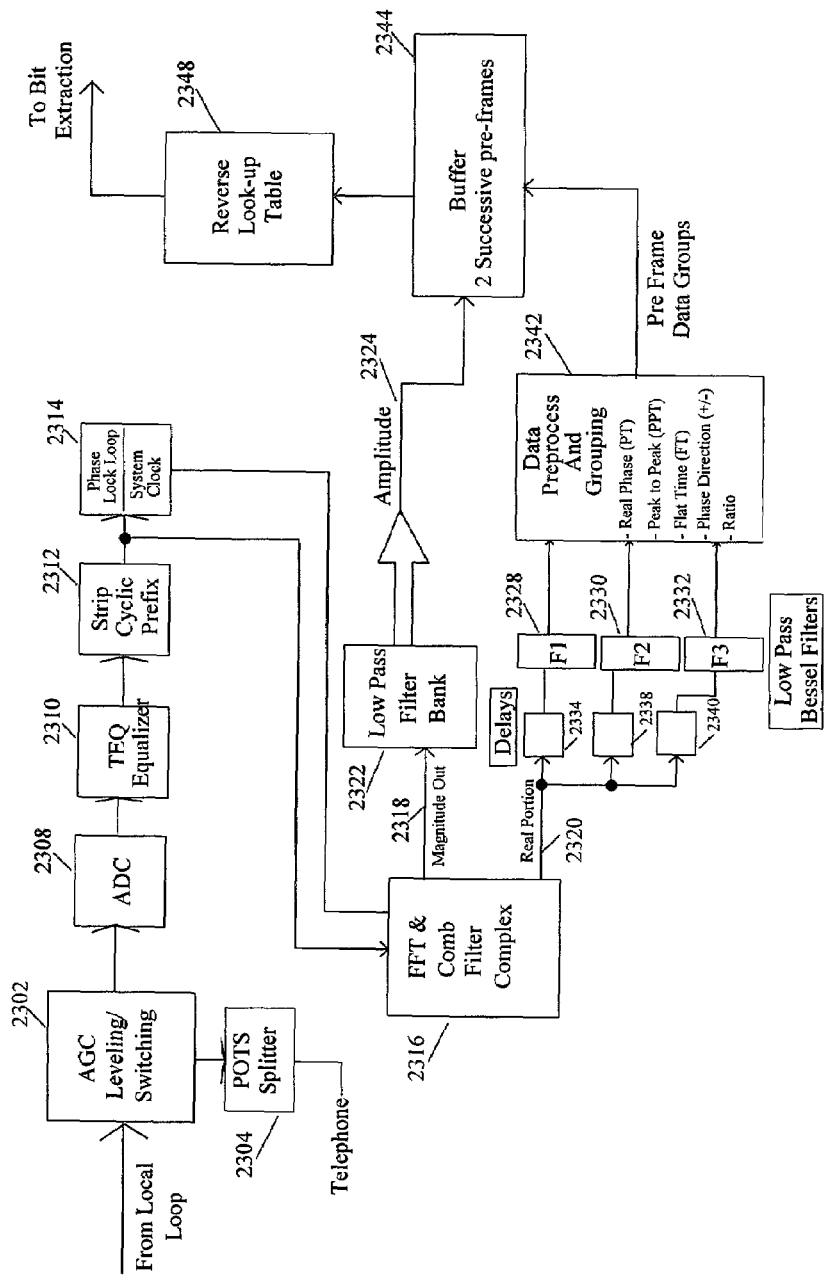
FIG. 23 is a schematic diagram for an all-digital embodiment of an HBDL receiver.

Referring to FIG. 23, an embodiment of a fully digital HBDL receiver 2300 is provided. Analog data comes in from the local loop to an analog gain control device 2302 which interacts with a similar element at the transmitter side to control the gain in the system to set it at a suitable level for the transmission medium in question. The data is fed to a splitter 2304 and passed to the telephone line. The data is also fed to an analog to digital converter 2308 which converts the analog stream into digital bits. Then the data stream is sent to a time equalizer 2310 to line up the timing of the data words at known time intervals. The equalizer 2310 generally serves two purposes. It removes any intersymbol interference from the channel that is longer than the cyclic prefix. Such interference would otherwise cause a symbol to interfere with the next symbol in time, and the channel would not look circular. Second, the equalizer 2310 can be used to partially bandpass the incoming signal and filter out-of-band energy. Next, the data is sent to a device 2312 to strip the cyclic prefix that was added at the transmitter side. The data is then split and sent both to a phase lock loop system clock generator 2314 for generating clock pulses that maintains synchronization of the receiver 2300 with the frequency and phase of the incoming data signal from the local loop. The clock generator 2314 sends timing pulses to the fast fourier transform and comb filter complex 2316. The incoming data stream is also fed into the FFT and comb filter complex 2316. The comb filter complex separates the frequency bands into different portions so that the incoming data stream elements are fed into the appropriate FFT within the FFT complex. The FFTs convert the incoming stream into orthogonal frequency domain information. The frequency domain information has complex components, including real and imaginary components. The frequency domain information also has a magnitude and phase component. From the FFT and comb filter complex 2316 we take the magnitude component 2318 and the real portion 2320 of the signal. The magnitude component is fed into a low pass filter bank 2322 that filters the signal to determine the amplitude 2324 of the signal. The real part of the signal 2320 is fed into a set of Bessel filters, including a fast Bessel filter 2328, as well as two slower Bessel filters 2330, 2332. The Bessel filters 2328, 2330 and 2330 are preceded by delays 2334, 2338, 2340 that delay the signal to account for the different speeds or cutoff frequencies of the filters and keep the different components of the signal in synchronization with each other. The output of the three filters 2328, 2330 and 2332 is fed into a data preprocess and grouping facility 2342. The data preprocess and grouping facility 2342 determines the characteristic values of the incoming signal, including the peak phase, the peak-to-peak time, the flat time, and phase direction, and can also calculate ratios for the ratio test. The need for three filters 2328, 2330 and 2332 is caused by the fact that noise may impact and substantially corrupt the quality of the signal passing through the faster, higher cutoff frequency filter 2328.

In an environment where noise corruption is significant a slower, lower cutoff-frequency filter is chosen to process signals for peak phase. Similarly, a two-filter approach is used to obtain flat time. By comparing the relative values of two adjacent cutoff frequency filters, it is possible to derive the flat time. To get the peak phase, the system uses the fastest available filter that works in the noise environment, applying, if necessary, a backward looking peak phase detection algorithm operating in a pipeline. Once the system calculates the peak value, it also determines the time at which the peak occurred. The system then calculates the time for the next peak in the same way. Once it has determined the times of the two peaks, then it can determine the value of the difference in time between the two peak times, i.e., the peak-to-peak time. The data preprocess and grouping facility 2342 can also calculate values, such as the ratios, for the ratio test. Out of the data preprocess and grouping facility 2342 come a series of data groups that can be appended to the amplitude value that comes out of the low pass filter bank 2322. At this point the data can be thought of as a pre-frame that is similar to the frame that was created to input on the transmitter side. The combined data is sent into a buffer 2344 that holds at least two successive preframes, which will be needed to extract values that rely on values from different cycles, such as peak-to-peak and ratio values. Next, the data is sent into a reverse lookup table 2344 that reverses the operation of the lookup table 2204 on the transmitter side, resulting in a set of demapped data words. The words from the lookup table 2348 are then sent for bit extraction in a manner similar to that for conventional ADSL.

Figure 24:
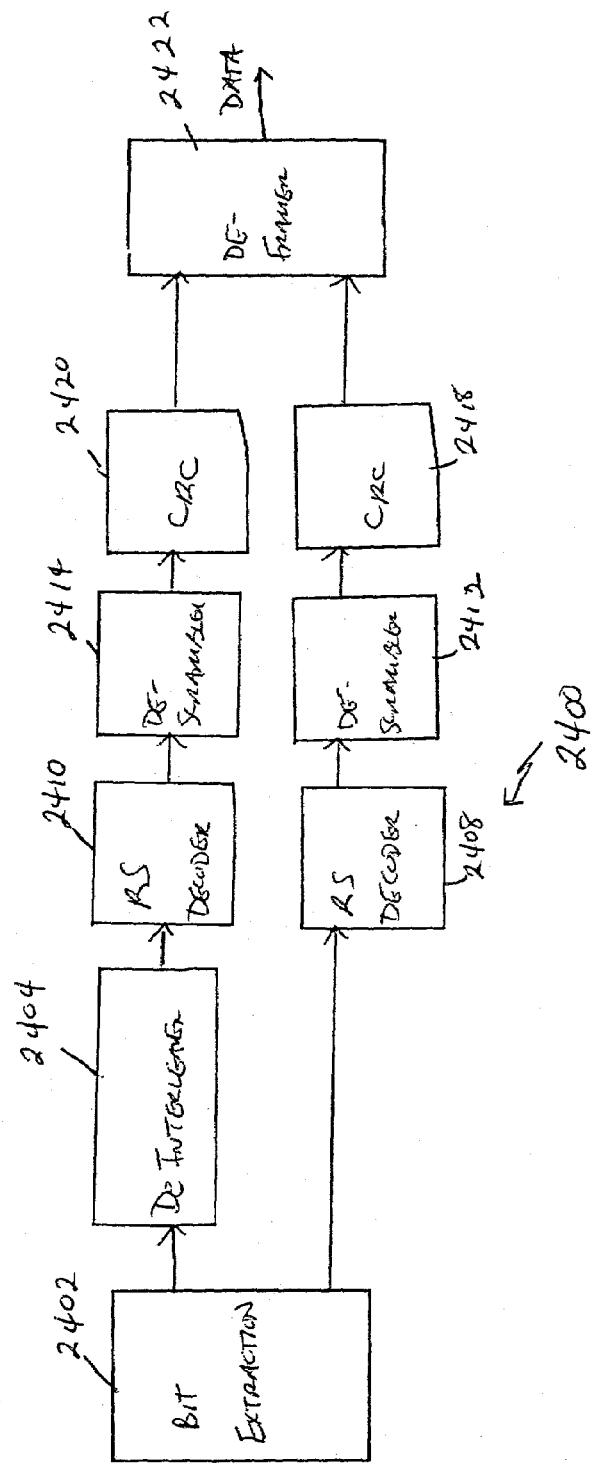
FIG. 24 is a schematic for a hardware configuration for bit extraction and data generation in HBDL.

FIG. 24 is a schematic of an embodiment of a device 2400 for converting the demapped words out of the reverse lookup table of FIG. 23 into data. First, the demapped words are sent to a bit extractor 2402 which decodes bits in a reverse of the tone ordering process of the transmitter side. The bit extractor 2402 separates the data into two streams, one that goes to the deinterleaver 2404 and another that goes straight into an RS decoder. If interleaving was done, then the data goes to the deinterleaver 2404 and on to an RS decoder 2410. After RS decoding in the RS decoders 2408, 2410, the data is sent to one of a pair of descramblers 2412, 2414, then to one of two CRC decoders 2418, 2420, and finally to a deframer 2422 for deframing. The output of the deframer 2422 is a data stream that matches what was sent to the transmitter. The configuration of FIG. 24 is standard for QAM-based DSL systems, and many variants will be known to those of ordinary skill in the art.

Figure 25:
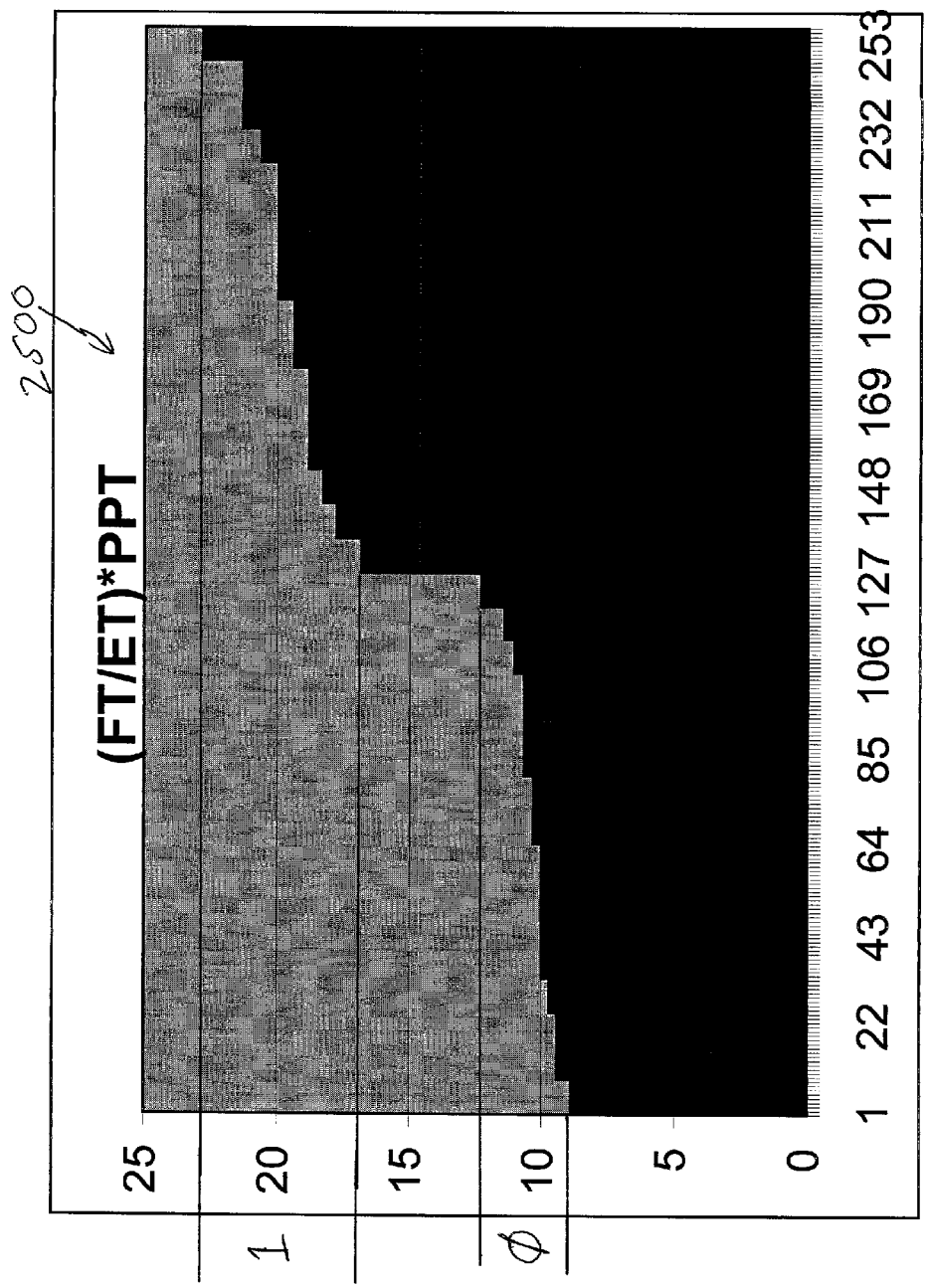
FIG. 25 is a test plot showing a ratio test in the present invention.

Referring to FIG. 25, a sample test plot is shown that shows how the ratios of certain characteristic values can be used to resolve a bit of data. The ratio shown on FIG. 25 is that of (FT/ET)*PPT, or flat time divided by event time, multiplied by peak-to-peak time. As can be seen, this ratio provides two distinct ranges of values. Values in the lower range can be assigned a value of zero, and values in the higher range can be assigned a value of 1. As seen in FIG. 25, the ratios provide a clearly resolvable bit of data.

Figure 26:
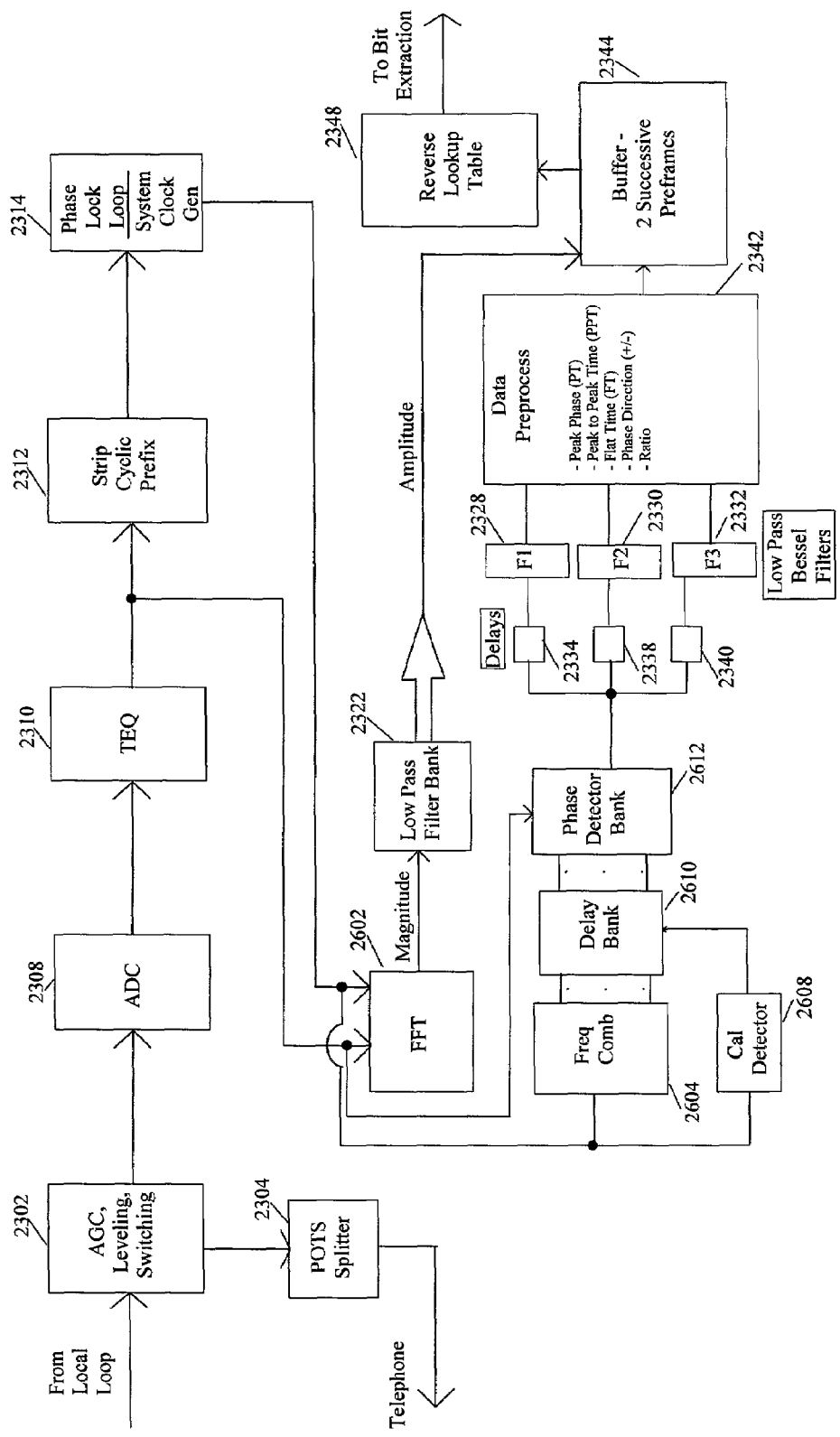
FIG. 26 is a schematic diagram for an HBDL receiver in a hybrid system with digital and discrete components.

Referring to FIG. 26, another embodiment of an HBDL receiver is shown, which is similar to the all digital receiver of FIG. 23, but this embodiment is a hybrid of digital and discrete devices. The AGC device 2302, ADC 2308, TEQ 2310, cyclic prefix stripper 2312 and phase-loop lock system clock generator 2314 all provide the same functions described in connection with FIG. 23. The signal is sent to an FFT 2602 which supplies a magnitude to the low pass filter bank 2322 to produce an amplitude component as in the embodiment of FIG. 23. The phase lock loop system clock generator 2314 also supplies timing pulses to phase detector bank 2612. The incoming data signals from the cyclic prefix stripper 2312 are sent to a frequency comb generator 2604 that separates the signals into frequency bins. The timing signals from the system clock are also sent to a calibration detector 2608, which feeds a delay bank 2610 that establishes resynchronization of the individual frequency signals that come from the frequency comb 2604 with the clock time. The frequency signals then arrive in a phase detector bank 2612 along with the incoming signals from the cyclic prefix stripper 2312. The phase detector bank compares the clock-synchronized signals from the frequency comb and delay bank with the incoming signals. In an embodiment it is a coherent detector known to those of skill in the art. Out of the phase detector bank comes a signal similar to what is produced by the FFT and comb filter complex of FIG. 23. The other elements of the receiver, such as the delays 2334, 2338, 2340, filters 2328, 2330, 2332, data preprocess and grouping facility 2342, buffer 2344, and reverse lookup table 2348 are similar to those of the all digital embodiment of a receiver of FIG. 23.

Although the truth tables described herein show use of peak-to-peak time, it is possible to generate data without using peak-to-peak time as a value, instead using the other variables described herein. That approach would not require a two-buffer approach that is needed to calculate peak-to-peak time. Such a system might just use peak phase, flat time, off time and amplitude to generate a sufficient number of bits. In the embodiment that doesn't use peak-to-peak time or ratio, the system uses peak phase, flat time, and off time, which only requires a much simpler embodiment, because it isn't necessary to have multiple buffers to extract data that depends on multiple cycles.

A further note on HBDL systems as disclosed herein is the fact that it is possible to extend its use well beyond the frequency limits and cell sizes of QAM-based DSL systems. Typical conventional DSL systems use frequencies ranging from 26 kHz to 1.104 MHz, with fixed cells at a size of 4.325 kHz. HBDL systems can go out to much higher frequencies, such as 30 MHz, and they do not require use of 4.325 kHz cells. Above 1.104 MHz an HBDL system can select a size of cell that is appropriate for the region, so the number of cells required is lower. Lowering the cell size means the system doesn't need as many FFT/IFFT combinations if they are used in the embodiment in question. As the frequencies move out to higher frequencies, the number of bits per second transmitted goes up dramatically. In embodiments, running near 30 MHz, an HBDL system can set up to run at 52 Mbits/second or higher, sufficient to deliver high quality video at reasonable transmission rates. VDSL has a similar capacity but a very limited capability in terms of what it can deliver. An HBDL system offers the possibility of a single device that can run the gamut of the frequency spectrum and provide multiple functions. In embodiments, because cell sizes may vary in HBDL, it may be desirable to define cells in between the cells that are used, in order to allow "breathing room" between cells.

In embodiments it may be discovered that certain frequency ranges have greater or lesser noise levels. Thus, it may be desirable to allocate more bits to frequencies with lower noise levels and fewer bits to frequencies with higher noise levels. In a single-tone case the system uses tone agility to select the best single operating frequency.

It may also be desirable to limit the cells used based on the characteristics of the symbol being generated. For example, because the system might call for a peak phase, very wide flat time and very long event time for a given word of data, the size of the cell could grow undesirably large. A lookup table can determine when these parameters are going to occur and use different parameters (e.g., inversion of phase or the ratio test) to supply bits instead. Thus, special cases of wave forms or symbols that are hard to transmit can be replaced based on their identification in a lookup table. The lookup table can also use an inference engine or similar facility to predict which special cases are likely to be problems.

In the above descriptions it was assumed that the methods and systems used herein do not rely on the amplitude component that causes QAM systems to be so susceptible to noise. However, it should be understood that an amplitude component can be used in the methods and systems described herein to provide another bit or more of data for a given symbol at a given frequency. This could be accomplished by using an In-phase (I) component only, or with an In-phase (I) and Quadrature (Q) component in combination.

An HBDL system can be used not only with conventional telephone wires but also to improve communications in other systems that rely on QAM or other amplitude modulation techniques. Cable Modems currently use forms of either QAM or 2B1Q, which is similar to QAM. Thus, a cable modem system could employ an HBDL protocol.

The wireless industry is using forms of QAM almost exclusively. As transmit density increases, interference from subscriber to subscriber will become noisy, causing dropped/re-transmitted information and other interference sources will cause problems as the data rates increase. HBDL technology will alleviate these problems. Thus HBDL can be used for wireless communications as well as telephone wire and cable communications. HBDL could also be used in second- and third-generation wireless technologies, Firewire, 802.11a, 802.11b, point to point wireless, cable, and other media that use QAM, PAM or 2B1Q technologies.

While the invention has been disclosed in connection with certain preferred embodiments, other embodiments would be understood by one of ordinary skill in the art and are encompassed herein. All patents, patent applications, specifications, books and other documents referenced herein are hereby incorporated by reference.

The invention claimed is:

1. A method of providing digital subscriber line communications, comprising:
   generating a signal of a plurality of tones, the variation in tones producing a gradual phase change of the signal from a start at a base or zero value to a next start of a phase change; the process is then reversed, returning to the base or zero value;
   transmitting the signal over a communications facility;
   measuring a characteristic of the received signal; and
   determining a value of a data bit based on the value of the measured characteristic.

2. A method of claim 1, wherein determining the value from the measured characteristic does not require calculation of an inphase component and does not require calculation of a quadrature component.

3. A method of claim 1, wherein the measured characteristic is a peak phase.

4. A method of claim 1, wherein the measured characteristic is a peak-to-peak time.

5. A method of claim 1, wherein the measured characteristic is a flat time.

6. A method of claim 1, wherein the measured characteristic is a relative flat time.

7. A method of claim 1, wherein the measured characteristic is an event time.

8. A method of claim 1, wherein the measured characteristic is an off time.

9. A method of claim 1, wherein the measured characteristic is a ratio that is calculated using at least two values selected from the at least one of a peak phase, a peak-to-peak time, flat time, off time, and event time of a symbol of a transmitted signal.

10. A method of claim 1, further comprising, obtaining at least one data bit from an inphase and a quadrature component of the signal.

11. A method of claim 1, wherein the measured characteristic is at least one of a peak phase, a peak-to-peak time, a flat time, and off time, an event time or a ratio of at least two of them, wherein the frequencies of the transmitted signal comprise a base frequency, a higher frequency and a lower frequency.

12. A method of claim 1, wherein the measured characteristic is at least one of a peak phase, a peak-to-peak time, a flat time, and off time, an event time or a ratio of at least two of them, and wherein the frequencies of the transmitted signal comprise an orthogonal frequency division multiplexed signal.

13. A method of claim 1, further comprising providing a facility for selecting preferred transmission frequency regions for the transmitted signal based on the characteristics of the communications facility.

14. A method of claim 1, wherein the communications facility is a telephone line.

15. A method of claim 1, wherein the communications facility is a wireless communications facility.

16. A method of claim 1, wherein the communications facility is a cable facility.

17. A method of providing HBDL (High Speed Broadband Digital Link) data signal at a DSL transmitter, comprising:
   providing a facility for receiving an incoming data signal;
   providing an encoding facility for encoding the signal;
   providing a data facility for assigning frequencies based on the incoming data signal;
   providing a frequency generator for generating the assigned frequencies, wherein frequencies are assigned to produce gradual phase change variations in the characteristics of the generated HBDL data signal, the characteristics selected from the group consisting of peak phase, peak-to-peak time, flat time, off time, event time or a ratio of at least two of them; and
   providing a facility for sending the generated frequencies to a communications facility.

18. A method of claim 17, wherein the frequencies of the transmitted signal comprise a base frequency, a higher frequency and a lower frequency.

19. A method of claim 17, wherein the frequencies of the transmitted signal comprise an orthogonal frequency division multiplexed signal.

20. A method of claim 17, wherein the communications facility is a telephone line.

21. A method of claim 17, wherein the communications facility is a wireless communications facility.

22. A method of claim 17, wherein the communications facility is a cable facility.

23. A method of claim 17, further comprising providing a facility for selecting frequency regions for the transmitted signal based on the characteristics of the communications facility.

24. A method of providing measurement of a HBDL signal at a DSL receiver, comprising:
   providing a facility for receiving a communications HBDL signal;
   providing a facility for measuring a characteristic of a gradual phasa change of the incoming signal, including at least one of a peak phase, a peak-to-peak, a flat time, an off time, an event time or a ratio of at least two of them, and no measured characteristic requires use of an amplitude bit; and
   providing a data facility for assigning data bits based upon the measured characteristics.

25. A method of claim 24, wherein assigning the data bit does not require calculation of an inphase component and does not require calculation of a quadrature component.

26. A method of claim 24, wherein the measured characteristic is a peak phase.

27. A method of claim 24, wherein the measured characteristic is a peak-to-peak time.

28. A method of claim 24, wherein the measured characteristic is a flat time.

29. A method of claim 24, wherein the measured characteristic is a relative flat time.

30. A method of claim 24, wherein the measured characteristic is an event time.

31. A method of claim 24, wherein the measured characteristic is an off time.

32. A method of claim 24, wherein the measured characteristic is a ratio that is calculated using at least two values selected from the at least one of a peak phase, a peak-to-peak time, flat time, off time, and event time of a symbol of a transmitted signal.

33. A method of claim 24, further comprising obtaining at least one additional data bit from an inphase and quadrature component of the transmitted signal.

34. A method of claim 24, wherein the signal varies between a base frequency, a higher frequency and a lower frequency.

35. A method of claim 24, wherein the signal is an orthogonal frequency division multiplexed signal.

36. A method of claim 24, wherein the communications facility is a telephone line.

37. A method of claim 24, wherein the communications facility is a wireless communications facility.

38. A method of claim 24, wherein the communications facility is a cable facility.

39. A method of claim 24, further comprising providing a facility for selecting frequency regions for the transmitted signal based on the characteristics of the communications facility.

40. A system for digital subscriber line communications, comprising:
   a signal generator for generating a signal of a plurality of tones, such that a variation in tones producing a gradual phase change of the signal from a start at a base or zero value to a next start of a phase change; the process is then reversed, returning to the base or zero value;
   a transmitter for transmitting the signal over a communications facility;
   a receiver for measuring a characteristic of the received signal; and
   a calculator for determining a value of a data bit based on the value of the measured characteristic.

41. A system of claim 40, wherein determining the value from the measured characteristic does not require calculation of an inphase component and does not require calculation of a quadrature component.

42. A system of claim 40, wherein the measured characteristic is a peak phase.

43. A system of claim 40, wherein the measured characteristic is a peak-to-peak time.

44. A system of claim 40, wherein the measured characteristic is a flat time.

45. A system of claim 40, wherein the measured characteristic is a relative flat time.

46. A system of claim 40, wherein the measured characteristic is an event time.

47. A system of claim 40, wherein the measured characteristic is an off time.

48. A system of claim 40, wherein the measured characteristic is a ratio that is calculated using at least two values selected from the at least one of a peak phase, a peak-to-peak time, flat time, off time, and event time of a symbol of a transmitted signal.

49. A system of claim 40, further comprising a second calculator for obtaining at least one data bit from an inphase and a quadrature component of the signal.

50. A system of claim 40, wherein the measured characteristic is at least one of a peak phase, a peak-to-peak time, a flat time, and off time, an event time or a ratio of at least two of them, wherein the frequencies of the transmitted signal comprise a base frequency, a higher frequency and a lower frequency.

51. A system of claim 40, wherein the measured characteristic is at least one of a peak phase, a peak-to-peak time, a flat time, and off time, an event time or a ratio of at least two of them, and wherein the frequencies of the transmitted signal comprise an orthogonal frequency division multiplexed signal.

52. A system of claim 40, further comprising a facility for selecting preferred transmission frequency regions for the transmitted signal based on the characteristics of the communications facility.

53. A system of claim 40, wherein the communications facility is a telephone line.

54. A system of claim 40, wherein the communications facility is a wireless communications facility.

55. A system of claim 40, wherein the communications facility is a cable facility.

56. A DSL transmitter, comprising:
   a facility for receiving an incoming HBDL data signal;
   an encoding facility for encoding the signal;
   a data facility for assigning frequencies based on the incoming HBDL data signal;
   a frequency generator for generating the assigned frequencies, wherein frequencies are assigned to produce gradual phase change variations in the characteristics of the generated signal, the characteristics selected from the group consisting of peak phase, peak-to-peak time, flat time, off time, event time or a ratio of at least two of them; and
   a transmission facility for sending the generated frequencies to a communications facility.

57. A system of claim 56, wherein the frequencies of the transmitted signal comprise a base frequency, a higher frequency and a lower frequency.

58. A system of claim 56, wherein the frequencies of the transmitted signal comprise an orthogonal frequency division multiplexed signal.

59. A system of claim 56, wherein the communications facility is a telephone line.

60. A system of claim 56, wherein the communications facility is a wireless communications facility.

61. A system of claim 56, wherein the communications facility is a cable facility.

62. A system of claim 56, further comprising a tone agility facility for selecting frequency regions for the transmitted signal based on the characteristics of the communications facility.

63. A DSL receiver, comprising:
- a receiving facility for receiving a communications HBDL signal;
- a detection facility for measuring a characteristic of a gradual phase change of the incoming signal, including at least one of a peak phase, a peak-to-peak time, a flat time, an off time, an event time or a ratio of at least two of them, and no measured characteristic requires use of an amplitude bit; and
- a data facility for assigning data bits based upon the measured characteristics.

64. A system of claim 63, wherein assigning the data bit does not require calculation of an inphase component and does not require calculation of a quadrature component.

65. A system of claim 63, wherein the measured characteristic is a peak phase.

66. A system of claim 63, wherein the measured characteristic is a peak-to-peak time.

67. A system of claim 63, wherein the measured characteristic is a flat time.

68. A system of claim 63, wherein the measured characteristic is a relative flat time.

69. A system of claim 63, wherein the measured characteristic is an event time.

70. A system of claim 63, wherein the measured characteristic is an off time.

71. A system of claim 63, wherein the measured characteristic is a ratio that is calculated using at least two values selected from the at least one of a peak phase, a peak-to-peak time, flat time, off time, and event time of a symbol of a transmitted signal.

72. A system of claim 63, further comprising a second calculator for obtaining at least one additional data bit from an inphase and quadrature component of the transmitted signal.

73. A system of claim 63, wherein the signal varies between a base frequency, a higher frequency and a lower frequency.

74. A system of claim 63, wherein the signal is an orthogonal frequency division multiplexed signal.

75. A system of claim 63, wherein the communications facility is a telephone line.

76. A system of claim 63, wherein the communications facility is a wireless communications facility.

77. A system of claim 63, wherein the communications facility is a cable facility.

78. A system of claim 63, further comprising a tone agility facility for selecting frequency regions for the transmitted signal based on the characteristics of the communications facility.

* * * * *